(12) United States Patent
Qamar et al.

(10) Patent No.: US 11,413,611 B2
(45) Date of Patent: Aug. 16, 2022

(54) MOLYBDENUM SULFIDE NANOSHEETS DECORATED WITH IRON PHOSPHIDE FOR HYDROGEN GAS EVOLUTION

(71) Applicant: King Fahd University of Petroleum and Minerals, Dhahran (SA)

(72) Inventors: Mohammad Qamar, Dhahran (SA); Mohammad Nahid Siddiqui, Dhahran (SA); Alaaldin M. Abdalla Adam, Dhahran (SA); Munzir H. Suliman, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 386 days.

(21) Appl. No.: 16/707,005

(22) Filed: Dec. 9, 2019

(65) Prior Publication Data

US 2021/0170384 A1 Jun. 10, 2021

(51) Int. Cl.
B01J 35/00 (2006.01)
B01J 27/051 (2006.01)
(Continued)

(52) U.S. Cl.
CPC ......... B01J 35/0033 (2013.01); B01J 27/051 (2013.01); B01J 27/1853 (2013.01);
(Continued)

(58) Field of Classification Search
CPC .... B01J 35/0033; B01J 35/006; B01J 35/023; B01J 35/1014; B01J 27/051;
(Continued)

(56) References Cited

U.S. PATENT DOCUMENTS 3,573,988 A * 4/1971 McKee .................. H01M 4/86
429/534
3,961,987 A * 6/1976 Mund .................... H01M 4/90
429/527
(Continued)

FOREIGN PATENT DOCUMENTS

CN 104258895 A 1/2015
CN 107537536 A 1/2018
(Continued)

OTHER PUBLICATIONS

Hung-Chang Hsu et al., "Surface morphology, magnetism and chemical state of Fe coverage on MoS2 substrate." Applied Surface Science 357, pp. 551-557. (Year: 2015).*

(Continued)

Primary Examiner — Patricia L. Hailey
(74) Attorney, Agent, or Firm — Oblon, McClelland, Maier & Neustadt, L.L.P.

(57) ABSTRACT

An electrocatalyst comprising molybdenum disulfide nanosheets with dispersed iron phosphide nanoparticles is described. The molybdenum disulfide nanosheets may have an average length in a range of 300 nm-1 μm and the iron phosphide nanoparticles may have an average diameter in a range of 5-20 nm. The electrocatalyst may have an electroactive surface area in a range of 10-50 mF·cm$^{-2}$ when deposited on a working electrode for use in a hydrogen evolution reaction.

19 Claims, 19 Drawing Sheets

(51) Int. Cl.

| | | |
|---|---|---|
| *B01J 35/02* | (2006.01) | |
| *B01J 27/185* | (2006.01) | |
| *B01J 35/10* | (2006.01) | |
| *C25B 1/04* | (2021.01) | |
| *C25B 11/051* | (2021.01) | |
| *C25B 11/055* | (2021.01) | |
| *C25B 11/073* | (2021.01) | |
| *B82Y 40/00* | (2011.01) | |
| *B82Y 30/00* | (2011.01) | |

(52) U.S. Cl.
CPC ............ *B01J 35/006* (2013.01); *B01J 35/023* (2013.01); *B01J 35/1014* (2013.01); *C25B 1/04* (2013.01); *C25B 11/051* (2021.01); *C25B 11/055* (2021.01); *C25B 11/073* (2021.01); *B82Y 30/00* (2013.01); *B82Y 40/00* (2013.01)

(58) Field of Classification Search
CPC .. B01J 27/1853; C25B 11/073; C25B 11/051; C25B 1/04; B82Y 30/00; B82Y 40/00; C01P 2002/78; C01P 2002/72; C01P 2006/12
USPC ........ 502/211, 213, 220, 221; 977/773, 778, 977/779
See application file for complete search history.

(56) References Cited

U.S. PATENT DOCUMENTS

| | | | | |
|---|---|---|---|---|
| 4,145,314 | A * | 3/1979 | Fung | ........................ B01J 23/40 502/185 |
| 4,299,892 | A * | 11/1981 | Dines | ..................... C01G 31/00 429/339 |
| 4,996,108 | A * | 2/1991 | Divigalpitiya | ........ C01B 19/007 427/430.1 |
| 7,951,747 | B1 * | 5/2011 | Thoma | ................. B01J 27/0515 502/220 |
| 2015/0025981 | A1 | 9/2015 | Lewis et al. | |
| 2021/0025064 | A1 * | 1/2021 | Siddiqui | ............... C25B 11/065 |
| 2021/0189574 | A1 * | 6/2021 | Ren | ........................ C23C 16/30 |

FOREIGN PATENT DOCUMENTS

| | | |
|---|---|---|
| CN | 107999114 A | 5/2018 |
| CN | 105734600 B | 7/2018 |
| CN | 106783201 B | 2/2019 |

OTHER PUBLICATIONS

Yuehua Fan et al., "A DFT study of transition metal (Fe, Co, Ni, Cu, Ag, Au, Rh, Pd, Pt and Ir)-embedded monolayer MoS2 for gas adsorption." Computational Materials Science 138, pp. 255-266. (Year: 2017).*

Yang Yang et al., "Recent advances in application of transition metal phosphides for photocatalytic hydrogen production." Chemical Engineering Journal 405, pp. 1-19. (Year: 2021).*

Luis Miguel Azofra et al., "Feasibility of N2 Binding and Reduction to Ammonia on Fe-Deposited MoS2 2D Sheets: A DFT Study." Chemistry: A European Journal, 23, pp. 8275-8279. (Year: 2017).*

Shanshan Ji et al., "Exfoliated MoS2 nanosheets as efficient catalysts for electrochemical hydrogen evolution." Electrochimica Acta 109, pp. 269-275. (Year: 2013).*

Zhenping Chen et al., "Strain control of the electronic structures, magnetic states, and magnetic anisotropy of Fe doped single-layer MoS2." Computational Materials Science 110, pp. 102-108. (Year: 2015).*

Yang, et al. ; Hydrogen Evolution Reaction Property of Molybdenum Disulfide/Nickel Phosphide Hybrids in Alkaline Solution ; Metals 8, 359 ; May 16, 2018 ; 18 Pages.

Askari, et al. ; Fe3O4 @MoS2 /RGO as an effective nano-electrocatalyst toward electrochemical hydrogen evolution reaction and methanol oxidation in two settings for fuel cell application ; Journal of Colloid and Interface Science, vol. 537 ; pp. 186-196 ; Mar. 1, 2019 ; Abstract Only ; 2 Pages.

Du, et al. ; Highly active and inexpensive iron phosphide nanorods electrocatalyst towards hydrogen evolution reaction ; International Journal of Hydrogen Energy ; pp. 1-7 ; Feb. 23, 2015 ; 7 Pages.

Suliman, et al. ; Facile synthesis of ultrathin interconnected carbon nanosheets as a robust support for small and uniformly-dispersed iron phosphide for the hydrogen evolution reaction ; Carbon 144 ; pp. 764-771 ; Jan. 4, 2019 ; 8 Pages.

Qayoom, et al. ; Indigenous kaolinite ore as cost effective adsorbent for re-refining of used lubricating oil; Revue des Energies Renouvelables vol. 21 ; pp. 473-485 ; Sep. 30, 2018 ; 13 Pages.

Suliman, et al. ; The impact of microstructural features of carbon supports on the electrocatalytic hydrogen evolution reaction✝ ; Catalysis Science & Technology ; Feb. 22, 2019 ; 7 Pages.

Adam, et al. ; Rationally Dispersed Molybdenum Phosphide on Carbon Nanotubes for the Hydrogen Evolution Reaction ; ACS Sustainable Chemistry & Engineering 6 ; pp. 11414-11423 ; 2018 ; 10 Pages.

Adam, et al. ; Interconnected Hollow Cobalt Phosphide Grown on Carbon Nanotubes for Hydrogen Evolution Reaction ; ACS Applied Materials & Interfaces ; pp. 29407-29416 ; 2018 ; 10 Pages.

Suliman, et al. ; FeP/MoS2 Enriched with Dense Catalytic Sites and High Electrical Conductivity for the Hydrogen Evolution Reaction ; ACS Sustainable Chemistry & Engineering ; pp. 17671-17681 ; 2019 ; 11 Pages.

* cited by examiner

MOLYBDENUM SULFIDE NANOSHEETS DECORATED WITH IRON PHOSPHIDE FOR HYDROGEN GAS EVOLUTION

BACKGROUND OF THE INVENTION

Technical Field

The present invention relates to an electrocatalyst of $MoS_2$ nanosheets and FeP nanoparticles.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The exploration of sustainable and environmentally benign energy sources has been prioritized by scientists to address serious climate problems and global energy demand. One of these energy sources, molecular hydrogen ($H_2$), is considered to be a promising energy carrier due to its high gravimetric energy density and eco-friendly characteristic of producing only water as the by-product. See G. M. Whitesides, G. W. Crabtree, Don't forget long-term fundamental research in energy, Science 315, 796-798 (2007), incorporated herein by reference in its entirety. Nowadays mass production of $H_2$ is carried out through a steam—methane reforming process ($CH_4+H_2O \leftrightarrows CO+H_2$). This process requires an intensive amount of energy and consumes a huge amount of fuel, which leads to a major problem, the production of $CO_2$, which can be emitted through water ($CO+H_2O \leftrightarrows CO_2+H_2$). So the search for a fossil fuel-free and clean method to produce $H_2$, such as by electrolysis, is at the forefront of energy research. Although mass production of $H_2$ through electrolysis of water has a great potential, the main limitation is that it requires a high potential in order to split the water molecule. See J. Wang, F. Xu, H. Jin, Y. Chen, Y. Wang, Non-noble metal-based carbon composites in hydrogen evolution reaction: fundamentals to applications, Adv. Mater. 29 1605838-1605875 (2017); P. C. K. Vesborg, B. Seger, I. B. Chorkendorff, Recent development in hydrogen evolution reaction catalysts and their practical implementation, *J. Phys. Chem. Lett.* 6, 951-957 (2015); M.S. Faber, S. Jin, Earth-abundant inorganic electrocatalysts and their nanostructures for energy conversion applications, Energy Environ. Sci. 7 3519-3542 (2014); and X. Zouc, Y. Zhang, Noble metal-free hydrogen evolution catalysts for water splitting, Chem. Soc. Rev. 44, 5148-5180 (2015), each incorporated herein by reference in their entirety.

Recently an intensive efforts has been applied to overcome these limitations by developing low cost, stable, and efficient (low potential) electrocatalysts to produce $H_2$ from water through electrolysis. Several cost effective materials with different compositions were developed from transition metals, carbides, nitride, borides, sulfides, and phosphides. See R. Michalsky, Y. J. Zhang, A.A. Peterson, Trends in the hydrogen evolution activity of metal carbide catalysts, ACS Catal. 4, 1274-1278 (2014); Y. Huang, Q. Gong, X. Song, K. Feng, K. Nie, F. Zhao, et al., $Mo_2C$ Nanoparticles dispersed on hierarchical carbon microflowers for efficient electrocatalytic hydrogen evolution, ACS Nano 10, 11337-11343 (2016); X. Fan, H. Zhou, X. Guo, $M_3C$ (M: Fe, Co, Ni) Nanocrystals encased in graphene nanoribbons: an active and stable bifunctional electrocatalyst for oxygen reduction and hydrogen evolution reactions, ACS Nano 9, 5125-5134 (2015); M. Qamar, A. Adam, B. Merzougui, A. Helal, O. Abdulhamid, M. N. Siddiqui, Metal-organic framework-guided growth of $Mo_2C$ embedded in mesoporous carbon as a high performance and stable electrocatalyst for the hydrogen evolution reaction, J. Mater. Chem. A 4, 16225-16232 (2016); B. Cao, G. M. Veith, J. C. Neuefeind, R. R. Adzic, P. G. Khalifah, Mixed close-packed cobalt molybdenum nitrides as non-noble metal electrocatalysts for the hydrogen evolution reaction, J. Am. Chem. Soc. 135, 19186-19192 (2013); W. F. Chen, K. Sasaki, C. Ma, A. I. Frenkel, N. Marinkovic, J. T. Muckerman, Y. Zhu, R. R. Adzic, Hydrogen-evolution catalysts based on non-noble metal nickel-molybdenum nitride nanosheets, Angew. Chem. Int. Ed. 51, 6131-6135 (2012); Y. Chen, G. Yu, W. Chen, Y. Liu, G.D. Li, P. Zhu, Q. Tao, Q. Li, J. Liu, X. Shen, H. Li, Highly active, nonprecious electrocatalyst comprising borophene subunits for the hydrogen evolution reaction, J. Am. Chem. Soc. 139, 12370-12373 (2017); P. R. Jothi, Y. Zhang, J. P. Scheifers, H. Park, B. P. Fokwa, Molybdenum diboride nanoparticles as a highly efficient electrocatalyst for the hydrogen evolution reaction, Sustainable Energy Fuels 1, 1928-1934 (2017); D. J. Li, U. N. Maiti, J. Lim, D. S. Choi, W. J. Lee, Y. Oh, et al., Molybdenum sulfide/N-doped CNT forest hybrid catalysts for high-performance hydrogen evolution reaction, Nano Lett. 14, 1228-1233 (2014); C. G. Morales-Guio, L. A. Stern, X. Hu, Nanostructured hydrotreating catalysts for electrochemical hydrogen evolution, Chem. Soc. Rev. 43, 6555-6569 (2014); D. Voiry, H. Yamaguchi, J. Li, R. Silva, D. C. Alves, T. Fujita, M. Chen, T. Asefa, V. B. Shenoy, G. Eda, M. Chhowalla, Enhanced catalytic activity in strained chemically exfoliated $WS_2$ nanosheets for hydrogen evolution, Nat. Mater. 12, 850-855 (2013); D. Kong, H. Wang, Z. Lu, Y. Cui, $CoSe_2$ nanoparticles grown on carbon fiber paper: an efficient and stable electrocatalyst for hydrogen evolution reaction, J. Am. Chem. Soc. 136, 4897-4900 (2014); Popczun E J, McKone J R, Read C G, Biacchi A J, Wiltrout A M, Lewis N S, Schaak R E. Nanostructured nickel phosphide as an electrocatalyst for the hydrogen evolution reaction. J Am Chem Soc 135, 9267-70 (2013); Wang X, Kolen'ko YV, Bao X Q, Kovnir K, Liu L. One-step synthesis of self-supported nickel phosphide nanosheet array cathodes for efficient electrocatalytic hydrogen generation. Angew Chem Int Ed 127, 8306-10, (2015); Moon J S, Jang J H, Kim E G, Chung Y H, Yoo S J, Lee Y K. The nature of active sites of $Ni_2P$ electrocatalyst for hydrogen evolution reaction. J Catal 326, 92-9 (2015); Cai Z X, Song X H, Wang Y R, Chen X. Electrodeposition-Assisted Synthesis of $Ni_2P$ Nanosheets on 3D Graphene/Ni Foam Electrode and Its Performance for Electrocatalytic Hydrogen Production. Chem Electro Chem 2, 1665-71 (2015); Laursen AB, Patraju KR, Whitaker MJ, Retuerto M, Sarkar T, Yao N, Ramanujachary K V, Greenblatt M, Dismukes G C. Nanocrystalline $Ni_5P_4$: a hydrogen evolution electrocatalyst of exceptional efficiency in both alkaline and acidic media. Energy Environ Sci 8, 1027-34 (2015); Ledendecker M, Krick Calderon S, Papp C, Steinrück H P, Antonietti M, Shalom M. The synthesis of nanostructured Ni5P4 films and their use as a non-noble bifunctional electrocatalyst for full water splitting. Angew Chem Int Ed 54, 12361-65 (2015); Wan L, Zhang J, Chen Y, Zhong C, Hu W, Deng Y. Nickel phosphide nanosphere: A high-performance and cost-effective catalyst for hydrogen evolution reaction. Int J Hydrogen Energy 41, 20515-22 (2016); Liu R, Gu S, Du H, Li C M. Controlled synthesis of FeP nanorod arrays as highly efficient hydrogen evolution cathode. J Mater Chem A 2, 17263-67 (2014); Cho G, Kim H, Park Y S, Hong Y K, Ha D H. Phase transformation of iron phosphide nanoparticles for hydrogen evolution reaction electrocatalysis. Int J Hydrogen Energy 43, 11326-34 (2018); Shi Y, Zhang B. Recent advances in transition metal phosphide nanomaterials: synthesis and applications in hydrogen evolution reaction. Chem Soc Rev 45, 1529-41 (2016); Sunman M H, Adam A, Siddiqui M N, Yamani Z H, Qamar M. Facile synthesis of ultrathin interconnected carbon nanosheets as a robust support for small and uniformly-dispersed iron phosphide for the hydrogen evolution reaction. Carbon 144, 764-71 (2019); Gao L, Chen S, Zhang H, Zou Y, She X, Yang D, Zhao Q, Zhao X. Porous CoP nanostructure electrocatalyst derived from DUT-58 for hydrogen evolution reaction. Int J Hydrogen Energy 43, 13904-10 (2018); Popczun E J, Read C G, Roske C W, Lewis N S, Schaak R E. Highly active electrocatalysis of the hydrogen evolution reaction by cobalt phosphide nanoparticles. Angew Chem Int Ed 53, 5427-30 (2014); Adam A, Suliman M H, Siddiqui M N, Yamani Z H, Merzougui B, Qamar M. Interconnected Hollow Cobalt Phosphide Grown on Carbon Nanotubes for Hydrogen Evolution Reaction. ACS Appl Mater Interfaces 10, 29407-16 (2014); Ding C, Qian J, Li Z, Li Y, Peng W, Zhang G, et al. Cobalt phosphide nanoparticles anchored on molybdenum selenide nanosheets as high-performance electrocatalysts for water reduction. Int J Hydrogen Energy 43, 20346-53 (2014); Cui W, Liu Q, Xing Z, Asiri A M, Alamry K A, Sun X. MoP nanosheets supported on biomass-derived carbon flake: One-step facile preparation and application as a novel high-active electrocatalyst toward hydrogen evolution reaction. Appl Catal B: Environ 164, 144-50 (2014); and A. Adam, M. H. Suliman, H. Dafalla, A. R. Al-Arfaj, M. N. Siddiqui, M, Qamar, Rationally dispersed molybdenum phosphide on carbon nanotubes for the hydrogen evolution reaction, ACS Sustainable Chem. Eng. 6, 11414-11423 (2018), each incorporated herein by reference in their entirety.

Due to the superior activity and low cost, various molybdenum (Mo) based electrocatalysts have been explored for HER, and $MoS_2$ can be considered as a potential electrocatalyst, so different studies were made to modify and enhance the structure and HER activity by introducing different compositions. See B. Hinnemann, P. G. Moses, J. Bonde, K. P. Joergensen, J. H. Nielsen, S. Horch, I. Chorkendorff and J. K. Norskov, J. Am. Chem. Soc.,127, 5308-5309 (2005); J. Huang, D. Hou, Y. Zhou, W. Zhou, G. Li, Z. Tang, L. Lia and S. Chen, J. Mater. Chem. A, 3, 22886-22891 (2015); and W. Zhou, D. Hou, Y. Sang, S. Yao, J. Zhou, G. Li, L. Li, H. Liu and S. Chen, J. Mater. Chem. A, 2, 11358-11364 (2014), each incorporated herein by reference in their entirety. 3D porous thin film of $MoS_2$ supported on Mo foil was investigated by Pu and coworkers, controlled defect $MoS_2$ nanosheets was reported by Xia et al. which showed an enhanced in the HER performance. See H. I. Karunadasa, E. Montalvo, Y. Sun, M. Majda, J. R. Long and C. J. Chang, Science, 335, 698-702 (2012); and Z. Pu, Q. Liu, A. M. Asiri, Y. Luo, X. Sun and Y. He, Electrochim. Acta, 168, 133-138 (2015), each incorporated herein by reference in their entirety.

Recently, transition metal phosphides (TMPs) have been widely investigated for HER such as $Ni_2P$ and $Ni_5P_4$, FeP, CoP, and MoP. See Popczun et al. (2013); Wang et al.; Moon et al.; Cai et al.; Laursen et al.; Ledendecker et al.; Wan et al.; Liu et al.; Cho et al.; Shi et al.; Suliman et al.; Gao et al.; Popczun et al. (2014); Adam et al. (2014); Ding et al.; Cui et al.; and Adam et al. (2018). Iron is considered the most abundant transition metal, and metal phosphides show high efficiency toward HER. The supported electrocatalysts show remarkable enhancement in the HER performance since more active sites are available to the reaction. The performance is additionally tuned by the support because of the unique interaction between the support and the metal-based electrocatalyst, that could be explained by the significant influence on critical interfacial processes. For instance, nitrogen-doped carbon nanotube functionalized with FeP and its HER performance was investigated by Sun et al. See Q. Liu, Z. Pu, A. M. Asiri, X. Sun, Nitrogen-doped carbon nanotube supported iron phosphide nanocomposites for highly active electrocatalysis of the hydrogen evolution reaction, Electrochim. Acta 149, 324-329 (2014), incorporated herein by reference in its entirety. Similarly, FeP supported on phosphorous doped single walled carbon nanotubes was evaluated for HER in different electrolytes. See C. Lv, Q. Yang, Q. Huang, Z. Huang, H. Xia, C. Zhang, Phosphorus doped single wall carbon nanotubes loaded with nanoparticles of iron phosphide and iron carbide for efficient hydrogen evolution, J. Mater. Chem. A 4, 13336-13343 (2015), incorporated herein by reference in its entirety. In another study, graphene was used to disperse FeP nanoparticles. See Z. Zhang, B. Lu, J. Hao, W. Yang, J. Tang, FeP Nanoparticles grown on graphene sheets as highly active non-precious-metal electrocatalysts for hydrogen evolution reaction, Chem. Commun. 50, 11554-11557 (2014), incorporated herein by reference in its entirety. Tang et al. reported that FeP nanoparticles were grown on candle soot, and investigated the related HER in acidic medium. See Z. Zhang, J. Hao, W. Yang, B. Lu, J. Tang, Modifying candle soot with FeP nanoparticles into high-performance and cost-effective catalysts for the electrocatalytic hydrogen evolution reaction, Nanoscale 7, 4400-4405 (2015), incorporated herein by reference in its entirety. Furthermore, carbon-shell-coated FeP nanoparticles has been studied as a scalable HER electrocatalyst. See D.Y. Chung, S. W. Jun, G. Yoon, H. Kim, J. M. Yoo, K.-S. Lee, T. Kim, H. Shin, A. K. Sinha, S. G. Kwon, K. Kang, T. Hyeon, Y.-E. Sung, Large-scale synthesis of carbon-shell-coated FeP nanoparticles for robust hydrogen evolution reaction electrocatalyst, J. Am. Chem. Soc. 139, 6669-6674 (2015), incorporated herein by reference in its entirety.

In view of the forgoing, one objective of the present invention is to provide an electrocatalyst having FeP nanoparticles dispersed onto active supports of $MoS_2$ nanosheets ($MoS_2$—NS) for the hydrogen evolution reaction (HER). The electrocatalyst has advantageous characteristics relating to HER efficiency, electrochemical active surface area (ECSA), electrical conductivity through electrochemical impedance spectroscopy (EIS), and number active sites with turnover frequency (TOF).

BRIEF SUMMARY OF THE INVENTION

According to a first aspect, the present disclosure relates to an electrocatalyst, comprising molybdenum disulfide nanosheets having an average length in a range of 300 nm-1 μm and iron phosphide nanoparticles having an average diameter in a range of 5-20 nm.

In one embodiment, the electrocatalyst consists essentially of Mo, S, Fe, and P.

In one embodiment, the molybdenum disulfide nanosheets are crystalline with interplanar spacing in a range of 0.26-0.28 nm or 0.62-0.64 nm.

In one embodiment, the molybdenum disulfide nanosheets have XRD peaks at 2(θ) Bragg angles of 33.2±1° and 59.1±1°.

In one embodiment, the iron phosphide nanoparticles are crystalline with interplanar spacing in a range of 0.23-0.25 nm.

In one embodiment, the iron phosphide nanoparticles have XRD peaks at 2(θ) Bragg angles of 37.2±1°, 48.3±1°, and 56.1±1°.

In one embodiment, the iron phosphide nanoparticles are distributed on the molybdenum disulfide nanosheets with an average nearest neighbor distance of the nanoparticles between 12-20 nm.

In one embodiment, the molybdenum disulfide nanosheets have an average thickness of less than 5 nm.

In one embodiment, the electrocatalyst has an electroactive surface area in a range of 10-50 mF·cm$^{-2}$.

In one embodiment, the electrocatalyst has a BET surface area in a range of 10-20 m$^2$/g.

In one embodiment, the iron phosphide nanoparticles have a Fe to P molar ratio in a range of 0.75-1.25.

In a further embodiment, the iron phosphide nanoparticles consist essentially of FeP.

In one embodiment, a mass ratio of the iron phosphide nanoparticles to the molybdenum disulfide nanosheets is in a range of 0.60-0.95.

According to a second aspect, the present disclosure relates to an electrochemical cell, comprising a working electrode comprising the electrocatalyst of the first aspect, a counter electrode, and an electrolyte solution in contact with both electrodes. The electrolyte solution comprises water and an inorganic acid.

In one embodiment, the working electrode comprises the electrocatalyst deposited on glassy carbon, and the working electrode has an overpotential in a range of 100-140 mV/cm$^2$ at a current density of 10 mA/cm$^2$.

In one embodiment, the inorganic acid has a concentration in a range of 0.2-1.0 M.

According to a third aspect, the present disclosure relates to a method for producing $H_2$ from an acidic electrolyte solution. The method comprises subjecting the electrodes of the electrochemical cell of the second aspect with a potential in a range of −1.0 to 1.0 V. In one embodiment, the electrocatalyst has a turnover frequency in a range of 0.16-0.30 s$^{-1}$.

In one embodiment, the electrocatalyst has a number of active sites per electrocatalyst mass in a range of $1.4 \times 10^{-4}$ to $1.4 \times 10^{-3}$ mol/g.

In one embodiment, the method further comprises a step of separately collecting $H_2$-enriched gas and $O_2$-enriched gas.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
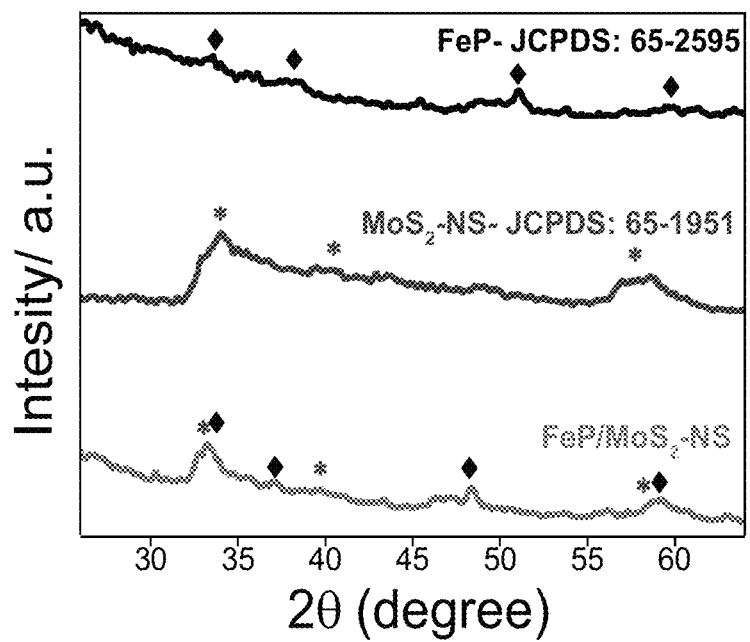
FIG. 1A shows the XRD of FeP/MoS$_2$.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of molybdenum include $^{92}Mo$, $^{93}Mo$, $^{94}Mo$, $^{95}Mo$, $^{96}Mo$, $^{97}Mo$, $^{98}Mo$, and $^{100}Mo$. Isotopes of S include $^{32}S$, $^{33}S$, $^{34}S$, and $^{36}S$. Isotopes of Fe include $^{54}Fe$, $^{56}Fe$, $^{57}Fe$, $^{58}Fe$, and $^{60}Fe$. Isotopes of phosphorus include $^{31}P$, $^{32}P$, and $^{33}P$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to an electrocatalyst comprising molybdenum disulfide nanosheets and iron phosphide nanoparticles.

The molybdenum disulfide nanosheets ($MoS_2$—NS) may have an average length in a range of 300 nm-1 μm, preferably 350-950 nm, more preferably 400-850 nm, even more preferably 500-800 nm. In one embodiment, the molybdenum disulfide nanosheets have an average thickness of less than 5 nm, preferably less than 4 nm, or less than 3 nm, or less than 2 nm.

In one embodiment, the molybdenum disulfide nanosheets consist essentially of Mo and S, meaning that at least 99.9 wt %, at least 99.99 wt %, at least 99.999 wt %, or about 100 wt %, or exactly 100 wt % of the molybdenum disulfide nanosheets, relative to a total weight of the molybdenum disulfide nanosheets, is Mo and S.

The molybdenum disulfide nanosheets may have an aspect ratio (length to width) in a range of 2:1-1:1, preferably 1.5:1-1:1, even more preferably 1.2:1-1:1, or 1.1:1-1:1. In one embodiment, the molybdenum disulfide nanosheets may be interconnected with one another.

In one embodiment, the molybdenum disulfide nanosheets are crystalline with interplanar spacing in a range of 0.26-0.28 nm, or about 0.27 nm; or 0.62-0.64 nm or about 0.63 nm. In one embodiment, the molybdenum disulfide nanosheets have XRD peaks at 2(θ) Bragg angles of 33.2±1° and 59.1±1°; or about 33.2° and about 59.1°.

The iron phosphide nanoparticles may have an average diameter in a range of 5-20, nm, preferably 7-19 nm, more preferably 9-18 nm, even more preferably 10-17 nm. The iron phosphide nanoparticles may have a spherical shape, or may be shaped like cylinders, boxes, spikes, flakes, plates, ellipsoids, toroids, stars, ribbons, discs, rods, granules, prisms, cones, flakes, platelets, sheets, or some other shape. Preferably the iron phosphide nanoparticles have a spherical shape.

In one embodiment, the iron phosphide nanoparticles may be substantially spherical, meaning that the distance from the particle centroid (center of mass) to anywhere on the nanoparticle outer surface varies by less than 30%, preferably by less than 20%, more preferably by less than 10% of the average distance.

In one embodiment, the iron phosphide nanoparticles may have an average Wadell sphericity value in a range of 0.3 to 0.9, or 0.3 to 0.8. The Wadell sphericity of a particle is defined by the ratio of the surface area of a sphere (which has the same volume as the given particle) to the surface area of the particle. The values of Wadell sphericity range from 0 to 1, where a value of 1 is a perfect sphere, and particles become less spherical as their sphericity approaches a value of 0. The Wadell sphericity may be approximated by $$\Psi \approx \left(\frac{bc}{a^2}\right)^{1/3},$$

where a, b, and c are the lengths of the long, intermediate, and short axes, respectively of an individual particle.

In one embodiment, the iron phosphide nanoparticles are monodisperse, having a coefficient of variation or relative standard deviation, expressed as a percentage and defined as the ratio of the particle diameter standard deviation (σ) to the particle diameter mean (μ), multiplied by 100%, of less than 25%, preferably less than 10%, preferably less than 8%, preferably less than 6%, preferably less than 5%. In a preferred embodiment, the iron phosphide nanoparticles are monodisperse having a particle diameter distribution ranging from 80% of the average particle diameter to 120% of the average particle diameter, preferably 85-115%, preferably 90-110% of the average particle diameter. In another embodiment, the iron phosphide nanoparticles are not monodisperse.

In one embodiment, the iron phosphide nanoparticles may be present in the form of agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles.

The primary particles may be the iron phosphide nanoparticles having a mean diameter as previously described.

In one embodiment, the iron phosphide nanoparticles are crystalline with interplanar spacing in a range of 0.23-0.25 nm or about 0.24 nm. The iron phosphide nanoparticles may have XRD peaks at 2(θ) Bragg angles of 37.2±1°, 48.3±1°, and 56.1±1°; or about 37.2°, about 48.3°, and about 56.1°.

In one embodiment, the iron phosphide nanoparticles consist essentially of Fe and P, meaning that at least 99.9 wt %, at least 99.99 wt %, at least 99.999 wt %, or about 100 wt %, or exactly 100 wt % of the iron phosphide nanoparticles relative to a total weight of the iron phosphide nanoparticles is Fe and P.

In one embodiment, the iron phosphide nanoparticles have a Fe to P molar ratio in a range of 0.75-1.25, preferably 0.80-1.20, preferably 0.90-1.10, or about 1.0. In one embodiment, the iron phosphide nanoparticles comprise $Fe_2P$, FeP, and/or $Fe_3P$.

In a further embodiment, the iron phosphide nanoparticles consist essentially of FeP, meaning that at least 99.9 wt %, at least 99.99 wt %, at least 99.999 wt %, or about 100 wt %, or exactly 100 wt % of the iron phosphide nanoparticles relative to a total weight of the iron phosphide nanoparticles is FeP.

In one embodiment, the iron phosphide nanoparticles are distributed on the molybdenum disulfide nanosheets with an average nearest neighbor distance of the nanoparticles of between 12-20 nm, preferably 13-19 nm, more preferably 14-18 nm. In one embodiment, at least 80%, preferably at least 90%, more preferably at least 95% of the iron phosphide nanoparticles in direct contact with the molybdenum disulfide nanosheets are not in direct contact with other iron phosphide nanoparticles. In one embodiment, some iron phosphide nanoparticles may be in contact with more than one molybdenum disulfide nanosheet, for instance, between a double layer of molybdenum disulfide nanosheets. In one embodiment, an iron phosphide nanoparticle may be in direct contact with a single molybdenum disulfide nanosheet at a single point, though in some embodiments, the nanosheets may curve around a portion of the nanoparticle or fold back onto the nanoparticle.

In one embodiment, the electrocatalyst has an electroactive surface area in a range of 10-50 $mF \cdot cm^{-2}$, preferably 12-40 $mF \cdot cm^{-2}$, more preferably 15-30 $mF \cdot cm^{-2}$, even more preferably 17-25 $mF \cdot cm^{-2}$, or about 21.3 $mF \cdot cm^{-2}$. In one embodiment, the electrocatalyst consists essentially of Mo, S, Fe, and P, meaning that at least 99.9 wt %, at least 99.99 wt %, at least 99.999 wt %, or about 100 wt %, or exactly 100 wt % of the electrocatalyst relative to a total weight of the electrocatalyst is Mo, S, Fe, and P.

In one embodiment, a mass ratio of the iron phosphide nanoparticles to the molybdenum disulfide nanosheets is in a range of 0.60-0.95, preferably 0.65-0.90, more preferably 0.70-0.88, or about 0.75-0.87.

In one embodiment, the electrocatalyst has a BET surface area in a range of 10-20 $m^2/g$, preferably 11-19 $m^2/g$, more preferably 12-18 $m^2/g$, even more preferably 13-17 $m^2/g$.

According to a second aspect, the present disclosure relates to an electrochemical cell comprising a working electrode, a counter electrode and an electrolyte solution in contact with both electrodes. The working electrode comprises the electrocatalyst of the first aspect. The electrolyte solution comprises water and an inorganic acid.

In one embodiment, the working electrode comprises glassy carbon and the electrocatalyst, and the working electrode has an overpotential in a range of 100-140 $mV/cm^2$, preferably 105-135 $mV/cm^2$, 110-130 $mV/cm^2$, 115-125 $mV/cm^2$, or about 120 $mV/cm^2$ at a current density of 5-20 $mA/cm^2$, 6-18 $mA/cm^2$, 8-15 $mA/cm^2$, or 10 $mA/cm^2$.

In one embodiment, the working electrode comprises electrocatalyst deposited on glassy carbon at a surface density per glassy carbon surface area in a range of 0.1-10 $mg/cm^2$, preferably 0.3-5 $mg/cm^2$, preferably 0.8-2 $mg/cm^2$, preferably 0.9-1.5 $mg/cm^2$, or about 1 $mg/cm^2$. In one embodiment, at least 80%, at least 85%, at least 90% at least 95%, at least 98%, at least 99%, at least 99.5% or about 100% of the working electrode surface area submerged in the electrolyte solution is the electrocatalyst. In one embodiment, less than 20%, less than 15%, less than 10%, less than 5%, less than 2%, less than 1%, less than 0.5%, or about 0% of the working electrode surface area in contact with the electrolyte solution is glassy carbon. In one embodiment, the layer of electrocatalyst on the glassy carbon has an average thickness in a range of 3-800 nm, preferably 4-500 nm, more preferably 5-400 nm.

In an alternative embodiment, the working electrode may comprise iron phosphide nanoparticles deposited on the surface of the electrode, while being essentially free of molybdenum disulfide. In another alternative embodiment, the working electrode may comprise molybdenum disulfide nanosheets deposited on the surface of the electrode, while being essentially free of iron phosphide.

In one embodiment, the electrochemical cell is a vessel having an internal cavity for holding the electrolyte solution. The vessel may be cylindrical, cuboid, frustoconical, spherical, or some other shape. The vessel walls may comprise a material including, but not limited to, glass, polypropylene, polyvinyl chloride, polyethylene, and/or polytetrafluoroethylene, and the vessel walls may have a thickness of 0.1-3 cm, preferably 0.1-2 cm, more preferably 0.2-1.5 cm. The internal cavity may have a volume of 2 mL-100 mL, preferably 2.5 mL-50 mL, more preferably 3 mL-20 mL. In another embodiment, for instance, for small scale or benchtop water oxidation, the internal cavity may have a volume of 100 mL-50 L, preferably 1 L-20 L, more preferably 2 L-10 L. In another embodiment, for instance, for pilot plant water oxidation, the internal cavity may have a volume of 50 L-10,000 L, preferably 70 L-1,000 L, more preferably 80 L-2,000 L. In another embodiment, for instance, for industrial plant-scale water oxidation, the internal cavity may have a volume of 10,000 L-500,000 L, preferably 20,000 L-400,000 L, more preferably 40,000 L-100,000 L. In one embodiment, one or more electrochemical cells may be connected to each other in parallel and/or in series. In another embodiment, the electrolyte solution may be in contact with more than one working electrode and/or more than one counter electrode.

In one embodiment, the working electrode may comprise a conductive material, such as, for example, platinum, platinum-iridium, gold, palladium, iridium, graphite, carbon, glassy carbon, a conductive polymer, an alloy, and/or the like, suitable to provide electroactive surfaces. Preferably the working electrode comprises glassy carbon.

In one embodiment, the counter electrode comprises gold, platinum, or carbon. In a further embodiment, the counter electrode comprises platinum. In one embodiment, the counter electrode may be in the form of a wire, a rod, a cylinder, a tube, a scroll, a sheet, a piece of foil, a woven mesh, a perforated sheet, or a brush. The counter electrode may be polished in order to reduce surface roughness or may be texturized with grooves, channels, divots, microstructures, or nanostructures. In one embodiment, the working electrode and the counter electrode may comprise the same material, for instance, glassy carbon.

In another further embodiment, where the counter electrode comprises platinum, the counter electrode is in the form of rod, wire, or a coiled wire. Alternatively, the counter electrode may comprise some other electrically-conductive material such as platinum-iridium alloy, iridium, titanium, titanium alloy, stainless steel, gold, cobalt alloy and/or some other electrically-conductive material, where an "electrically-conductive material" as defined here is a substance with an electrical resistivity of at most $10^{-6}$ Ω·m, preferably at most $10^{-7}$ Ω·m, more preferably at most $10^{-8}$ Ω·m at a temperature of 20-25° C. In another alternative embodiment, the working electrode may not comprise glassy carbon, but may comprise any of the previously mentioned metals with the electrocatalyst deposited thereon.

In a preferred embodiment, the counter electrode has at least one outer surface comprising an essentially inert, electrically conducting chemical substance, such as platinum, gold, or carbon. In another embodiment, the counter electrode may comprise solid platinum, gold, or carbon. The form of the counter electrode may be generally relevant only in that it needs to supply sufficient current to the electrolyte solution to support the current required for the electrochemical reaction of interest. The material of the counter electrode should thus be sufficiently inert to withstand the chemical conditions in the electrolyte solution, such as acidic or basic pH values, without substantially degrading during the electrochemical reaction. The counter electrode preferably should not leach out any chemical substance that interferes with the electrochemical reaction or might lead to undesirable contamination of either electrode.

In a further embodiment, where the counter electrode comprises platinum, the counter electrode may be in the form of a mesh. In one embodiment, the counter electrode in the form of a mesh may have a nominal aperture or pore diameter of 0.05-0.6 mm, preferably 0.1-0.5 mm, more preferably 0.2-0.4 mm, and/or a wire diameter of 0.01-0.5 mm, preferably 0.08-0.4 mm, more preferably 0.1-0.3 mm. In other embodiments, the counter electrode may be considered a gauze with a mesh number of 40-200, preferably 45-150, more preferably 50-100. In other embodiments, the counter electrode may be in the form of a perforated sheet or a sponge. In one embodiment, the counter electrode may be in the form of a mesh with one or more bulk dimensions (length, width, or thickness) as previously described for the composite thin film electrode.

In one embodiment, the counter electrode is in the form of a rod or wire. The rod or wire may have straight sides and a circular cross-section, similar to a cylinder. A ratio of the length of the rod or wire to its width may be 1,500:1-1:1, preferably 500:1-2:1, more preferably 300:1-3:1, even more preferably 200:1-4:1. The length of the rod or wire may be 0.5-50 cm, preferably 1-30 cm, more preferably 3-20 cm, and a long wire may be coiled or bent into a shape that allows the entire wire to fit into an electrochemical cell. The diameter of the rod or wire may be 0.5-20 mm, preferably 0.8-8 mm, more preferably 1-3 mm. In one embodiment, the diameter of the rod or wire may be smaller, for instance, with a diameter in a range of 0.1-1 mm, preferably 0.2-0.5 mm, or about 0.25 mm. In some embodiments, a rod may have an elongated cross-section, similar to a ribbon or strip of metal.

In one embodiment, the electrolyte solution comprises water and an inorganic acid at a concentration of 0.2-1.0 M, preferably 0.3-0.8 M, more preferably 0.4-0.7 M, or about 0.5 M, though in some embodiments, the inorganic acid may be present at a concentration of less than 0.1 M or greater than 1.0 M. The inorganic acid may be may be specifically exemplified by oxo acids such as boric acid, iodic acid, phosphoric acid, diphosphoric acid, tripolyphosphoric acid, sulfuric acid, hypochlorous acid, chlorous acid, perchloric acid, nitric acid, nitrous acid, hypophosphorous acid, phosphorous acid, sulfurous acid or the like; hydrogen acids such as hydrobromic acid, hydrochloric acid, hydrofluoric acid, hydroiodic acid, hydrosulfuric acid or the like; and peroxo acids such as peroxonitric acid, peroxophosphoric acid, peroxodiphosphoric acid, peroxosulfuric acid, peroxodisulfuric acid or the like or some other inorganic acid. Preferably the inorganic acid is sulfuric acid, $H_2SO_4$. In an alternative embodiment, an organic base may be used, such as acetic acid. In another alternative embodiment, base may be used instead of an acid.

The water may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water and at 25° C. has a conductivity at less than 10 µS·cm$^{-1}$, preferably less than 1 µS·cm$^{-1}$, a resistivity greater than 0.1 MΩ·cm, preferably greater than 1 MΩ·cm, more preferably greater than 10 MΩ·cm, a total solid concentration less than 5 mg/kg, preferably less than 1 mg/kg, and a total organic carbon concentration less than 1000 µ/L, preferably less than 200 µg/L, more preferably less than 50 µg/L.

In one embodiment, the electrolyte is a solid electrolyte. There are several forms of solid electrolytes that include but are not limited to gel electrolyte and solid electrolyte. Gel electrolytes resemble closely liquid electrolytes. In essence, they are liquids in a flexible lattice framework. They are formed by dissolving a salt in a polar liquid and adding polymer network to give the material mechanical stability. Examples of gel electrolytes include, but not limited to sodium acetate or sulfate/polyvinyl alcohol/polyethylene oxide, lithium trifluoromethane sulfonic acid in poly(vinylidene fluoride), poly(1-vinyl-3-propylimidazolium bis (fluorosulfonyl)imide)/1-ethyl-3-methyl imidazolium bis (fluorosulfonyl)imide (EMIFSI), and the like. Dry polymer electrolytes differ from liquid and gel electrolytes in that salt is directly dissolved into the solid medium. Examples of such polymers include, but not limited to polyethers, polyesters, polyamines, polythiols, polysiloxane, and combination thereof. In order to increase the mechanical strength and conductivity of such electrolytes, composites are used in combination with an inert ceramic phase. There are two major classes of such electrolytes: polymer-in-ceramic and ceramic-in-polymer. In solid ceramic electrolytes, ions migrate through the ceramic phase by means of vacancies or interstitials within the lattice. Also, there are glassy-ceramic electrolytes. Another type of solid electrolyte is an organic ionic plastic crystal which is a type of organic salts exhibiting mesophases, i.e., a state of matter intermediate between liquid and solid. In such an electrolyte, mobile ions are orientationally or rotationally disordered while their centers are located at ordered sites in a crystal structure. They have various forms of disorder due to one or more solid-solid phase transitions below the melting point, and therefore, have plastic properties and good mechanical flexibility as well as improved electrode electrolyte interfacial contact. In particular, protic organic ionic plastic crystals (POIPCs), which are solid protic organic salts formed by proton transfer from a Bronsted acid to a Bronsted base and in essence are protic ionic liquids in the molten state, have found to be promising solid-state proton conductors for fuel cells.

Examples include 1,2,4-triazolium perfluorobutanesulfonate and imidazolium methane sulfonate.

In one embodiment, a weight percentage of the electrocatalyst relative to a total weight of the electrolyte solution may be in a range of 0.01-20 wt %, preferably 0.1-10 wt %, more preferably 0.5-5 wt %, more preferably 1-4 wt %, or 0.0001-0.001 wt %, or 0.0005-0.005 wt %, or 0.001-0.01 wt %, or 0.005-0.05 wt %, or 0.01-0.1 wt %, or 0.05-0.5 wt %, or 0.1-1.0 wt %. In one embodiment, the electrolyte solution is constantly stirred or agitated. In an alternative embodiment, the electrocatalyst may be dispersed in the electrolyte solution.

In one embodiment, the electrochemical cell further comprises a reference electrode in contact with the electrolyte solution. A reference electrode is an electrode which has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In one embodiment, a reference electrode is present and is a reversible hydrogen electrode (RHE). However, in some embodiments, the electrochemical cell does not comprise a third electrode.

According to a third aspect, the present disclosure relates to a method for producing $H_2$ from an acidic electrolyte solution. The method comprises subjecting the electrodes of the electrochemical cell of the second aspect with a potential in a range of 0.1-1.0 V, preferably 0.11-0.90 V, more preferably 0.13-0.50 V, even more preferably 0.14-0.30 V, or 0.10-0.20 V, or about 0.160 V, or 0.20-0.30 V, or about 0.25 V. In one embodiment, the electrodes are subjected to a voltage in a range of −1.0 to 1.0 $V_{RHE}$, preferably −0.7 to 0.8 $V_{RHE}$, more preferably −0.5 to 0.4 $V_{RHE}$, even more preferably −0.3 to 0.1 $V_{RHE}$, or −0.25 to 0.05 $V_{RHE}$, or −0.20 to −0.05 $V_{RHE}$. Here, "the electrodes" refers to the working electrode and the counter electrode.

Preferably the working electrode functions as the anode, receiving a positive potential to oxidize $H_2O$ into $O_2$ gas and $H^+$, while the counter electrode functions as the cathode, receiving a negative potential to reduce $H^+$ into $H_2$ gas. This is summarized by the following reactions:

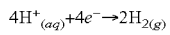  Cathode (reduction): $4H^+_{(aq)} + 4e^- \rightarrow 2H_{2(g)}$

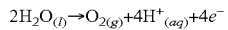  Anode (oxidation): $2H_2O_{(l)} \rightarrow O_{2(g)} + 4H^+_{(aq)} + 4e^-$

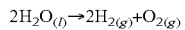  Overall reaction: $2H_2O_{(l)} \rightarrow 2H_{2(g)} + O_{2(g)}$

In one embodiment, the $H_2$ is produced by a Volmer-Heyrovsky mechanism as shown in Example 4. Here, the reduction reaction first involves $H^+_{(aq)} + e^- \rightarrow H_{(ads)}$, where $H_{(ads)}$ denotes adsorbed atomic hydrogen, which may be adsorbed onto an electrode or the electrocatalyst. This is described as a Volmer reaction. The adsorbed atomic hydrogen $H_{(ads)}$ may combine with other adsorbed atomic hydrogen to form $H_2$ gas, as described by the Tafel reaction: $H_{(ads)} + H_{(ads)} \rightarrow H_{2(g)}$. Alternatively, the adsorbed atomic hydrogen $H_{(ads)}$ may form hydrogen gas by simultaneously combining with dissolved $H^+$ being reduced, as described by the Heyrovsky reaction: $H_{(ads)} + H^+_{(aq)} + e^- \rightarrow H_{2(g)}$. In one embodiment, all of the $H_2$ gas evolved by the disclosed method is produced by the Volmer and Heyrovsky reactions, without contribution from the Tafel reaction. In one embodiment, at least 60 vol %, at least 80 vol %, at least 90 vol %, at least 95 vol % of the $H_2$ gas evolved in the method occurs by the Volmer and Heyrovsky reactions, while the remaining $H_2$ gas evolved is produced by the Volmer and Tafel reactions.

In another embodiment, the potentials may be switched, wherein the working electrode functions as the cathode and receives a negative potential, and the counter electrode functions as the anode and receives a positive potential. In an alternative embodiment, the electrodes may be subjected to an alternating current (AC) in which the anode and cathode roles are continually switched between the two electrodes.

Preferably, to maintain uniform concentrations and/or temperatures of the electrolyte solution, the electrolyte solution may be stirred or agitated during the step of the subjecting. The stirring or agitating may be done intermittently or continuously. This stirring or agitating may be by a magnetic stir bar, a stirring rod, an impeller, a shaking platform, a pump, a sonicator, a gas bubbler, or some other device. Preferably the stirring is done by an impeller or a magnetic stir bar.

In one embodiment, the electrocatalyst has a number of active sites in a range of $1.0 \times 10^{-8}$ to $1.0 \times 10^{-7}$ mol, preferably $1.2 \times 10^{-8}$ to $5.0 \times 10^{-8}$ mol, more preferably $1.5 \times 10^{-8}$ to $2.5 \times 10^{-8}$ mol, even more preferably $1.8 \times 10^{-8}$ to $1.9 \times 10^{-8}$ mol. The number of active sites may be the number of locations on the electrocatalyst where atomic hydrogen may adsorb as described in the Volmer reaction.

In one embodiment, the electrocatalyst has a total mass in a range of 0.001-10 mg, preferably 0.01-1.0 mg, more preferably 0.03-0.50 mg, even more preferably 0.04-0.10 mg, or 0.05-0.08 mg, or about 0.07 mg.

In one embodiment, the electrocatalyst has a number of active sites per electrocatalyst mass in a range of $1.4 \times 10^{-4}$ to $1.4 \times 10^{-3}$ mol/g, preferably $1.8 \times 10^{-4}$ to $1.0 \times 10^{-3}$ mol/g, more preferably $2.2 \times 10^{-4}$ to $8.0 \times 10^{-4}$ mol/g, even more preferably $2.4 \times 10^{-4}$ to $5.0 \times 10^{-4}$ mol/g, or about $2.6 \times 10^{-4}$ mol/g.

In one embodiment, the electrocatalyst has a turnover frequency in a range of 0.16-0.30 $s^{-1}$, preferably 0.17-0.25 $s^{-1}$, more preferably 0.18-0.22 $s^{-1}$, or about 0.20 $s^{-1}$. Here, the turnover frequency is the number of $H_{(ads)}$ reacted per active site per second.

In one embodiment, the working electrode has an electroactive surface area in a range of 10-50 mF·$cm^{-2}$, preferably 12-40 mF·$cm^{-2}$, more preferably 15-30 mF·$cm^{-2}$, even more preferably 17-25 mF·$cm^{-2}$, or about 21.3 mF·$cm^{-2}$.

In one embodiment, before or immediately before subjecting the electrodes of the electrochemical cell with the potential, the electrolyte solution consists essentially of water and the inorganic acid meaning that at least 99.9 wt %, at least 99.99 wt %, at least 99.999 wt %, or about 100 wt %, or exactly 100 wt % of the electrolyte solution relative to a total weight of the electrolyte solution is water and the inorganic acid. Similarly, in one embodiment, the electrolyte solution may consist essentially of water, the inorganic acid, and dissolved ambient gasses (such as $O_2$ and $N_2$) before or immediately before subjecting the electrodes with the potential.

In one embodiment, before or immediately before subjecting the electrodes of the electrochemical cell with the potential, the electrolyte solution consists essentially of water, the inorganic acid, and the electrocatalyst, meaning that at least 99.9 wt %, at least 99.99 wt %, at least 99.999 wt %, or about 100 wt %, or exactly 100 wt % of the electrolyte solution relative to a total weight of the electrolyte solution is water, the inorganic acid, and the electrocatalyst. Similarly, in one embodiment, the electrolyte solution may consist essentially of water, the inorganic acid, the electrocatalyst, and dissolved ambient gasses (such as $O_2$ and $N_2$) before or immediately before subjecting the electrodes with the potential. Here, the electrolyte solution may contain dispersed electrocatalyst, as some electrocatalyst may detach from the working electrode.

In one embodiment, the electrocatalytic cell when subjected to a constant potential in a range of 120-220 mV, preferably 150-180 mV, or about 160 mV, has current densities that vary by less than 18%, preferably by less than 15%, more preferably by less than 10% of the average current density over a time period in a range of 20-80 h, preferably 30-70 h, or 30-50 h. An example of such behavior is shown in FIG. 3C.

In one embodiment, the potential may be applied to the electrodes by a battery, such as a battery comprising one or more electrochemical cells of alkaline, lithium, lithium-ion, nickel-cadmium, nickel metal hydride, zinc-air, silver oxide, and/or carbon-zinc. In another embodiment, the potential may be applied through a potentiostat or some other source of direct current, such as a photovoltaic cell. In one embodiment, a potentiostat may be powered by an AC adaptor, which is plugged into a standard building or home electric utility line. In one embodiment, the potentiostat may connect with a reference electrode in the electrolyte solution. Preferably the potentiostat is able to supply a relatively stable voltage or potential. For example, in one embodiment, the electrochemical cell is subjected to a voltage that does not vary by more than 5%, preferably by no more than 3%, preferably by no more than 1.5% of an average value throughout the subjecting. In another embodiment, the voltage may be modulated, such as being increased or decreased linearly, being applied as pulses, or being applied with an alternating current. In one embodiment, the counter electrode may be considered the auxiliary electrode. However, in some embodiments, the working electrode may be considered the auxiliary electrode.

In one embodiment, the method also involves the step of separately collecting $H_2$-enriched gas and $O_2$-enriched gas. In one embodiment, the space above each electrode may be confined to a vessel in order to receive or store the evolved gases from one or both electrodes. The collected gas may be further processed, filtered, or compressed. Preferably the $H_2$-enriched gas is collected above the cathode, and the $O_2$-enriched gas is collected above the anode. The electrochemical cell, or an attachment, may be shaped so that the headspace above the composite thin film electrode is kept separate from the headspace above the reference electrode. In one embodiment, the $H_2$-enriched gas and the $O_2$-enriched gas are not 100 vol % $H_2$ and 100 vol % $O_2$, respectively. For example, the enriched gases may also comprise $N_2$ from air, and water vapor and other dissolved gases from the electrolyte solution. The $H_2$-enriched gas may also comprise $O_2$ from air. The $H_2$-enriched gas may comprise greater than 20 vol % $H_2$, preferably greater than 40 vol % $H_2$, more preferably greater than 60 vol % $H_2$, even more preferably greater than 80 vol % $H_2$, relative to a total volume of the receptacle collecting the evolved $H_2$ gas. The $O_2$-enriched gas may comprise greater than 20 vol % $O_2$, preferably greater than 40 vol % $O_2$, more preferably greater than 60 vol % $O_2$, even more preferably greater than 80 vol % $O_2$, relative to a total volume of the receptacle collecting the evolved $O_2$ gas. In some embodiments, the evolved gases may be bubbled into a vessel comprising water or some other liquid, and higher concentrations of $O_2$ or $H_2$ may be collected. In one embodiment, evolved $O_2$ and $H_2$, or $H_2$-enriched gas and $O_2$-enriched gas, may be collected in the same vessel.

Several parameters for the method for producing $H_2$ from water may be modified to lead to different reaction rates, yields, and other outcomes. These parameters include, but are not limited to, electrolyte type and concentration, pH, pressure, solution temperature, current, voltage, stirring rate, electrode surface area, texture and nanostructure of the electrocatalyst and electrodes, substrate conductivity, and exposure time. A variable DC current may be applied at a fixed voltage, or a fixed DC current may be applied at a variable voltage. In some instances, AC current or pulsed current may be used. A person having ordinary skill in the art may be able to adjust these and other parameters, to achieve different desired nanostructures. In other embodiments, the electrochemical cell may be used for other electrochemical reactions or analyses.

The examples below are intended to further illustrate protocols for preparing, characterizing the electrocatalyst, and uses thereof, and are not intended to limit the scope of the claims.

EXAMPLE 1

Experimental 1.25 g of hexaammonium heptamolybdate tetrahydrate and 2.30 g of thiourea were dissolved in deionized water under stirring. The solution was transfer into 45 mL Teflon® autoclave and reacted at 220° C. for 20 h. After the reaction time, the resulting black powder was washed with deionized water several times and then with ethanol, and dried under vacuum at 60° C.

The functionalization of the nanosheet support was done using the previously reported method, and the as prepared FeP/MoS$_2$—NS catalytic activity toward HER was investigated. See Suliman M H, Adam A, Siddiqui M N, Yamani Z H, Qamar M. Facile synthesis of ultrathin interconnected carbon nanosheets as a robust support for small and uniformly-dispersed iron phosphide for the hydrogen evolution reaction. Carbon 144, 764-71 (2019), incorporated herein by reference in its entirety. For comparison, MoS$_2$ nanosheets without FeP nanoparticles, and FeP nanoparticles without MoS$_2$ nanosheets, were also prepared and investigated.

EXAMPLE 2

Results

Figure 1B:
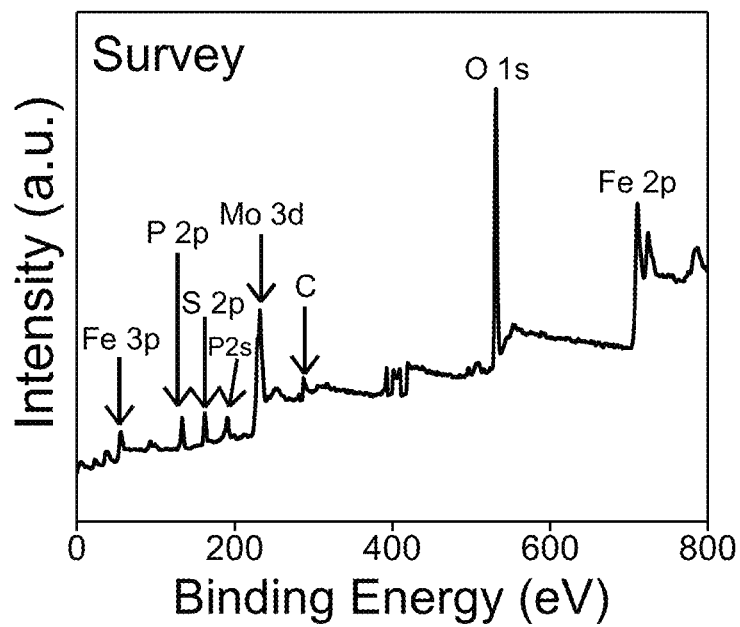
FIG. 1B shows the XPS of FeP/MoS$_2$.
Figure 1C:
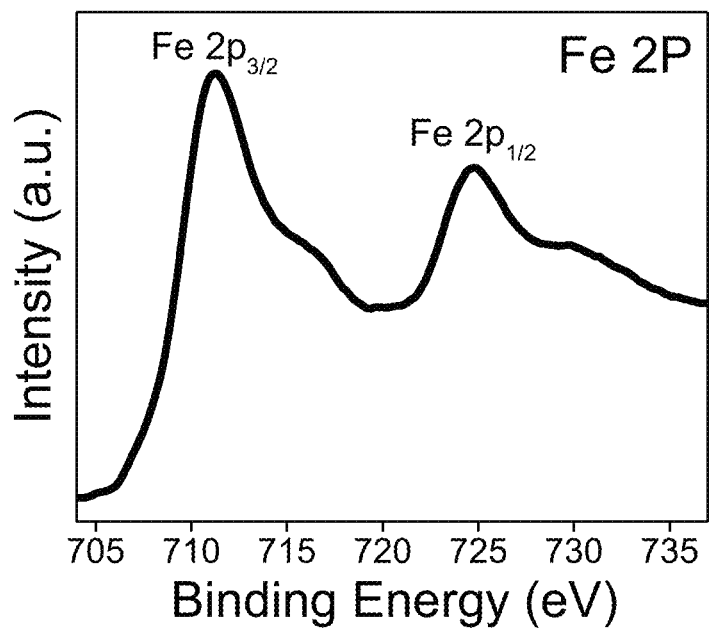
FIG. 1C shows the XPS of FeP/MoS$_2$ at the Fe 2p spectrum.

The phase of the FeP/MoS$_2$ composite was confirmed using powder X-ray diffraction as shown in FIG. 1A. The broad peaks at 33.2°, 39.9°, 48.6°, and 59.1° correspond to the (002), (100), (103), and (105) planes of MoS$_2$ nanosheets, respectively. The diffraction peaks located at 32.8° (011), 37.2° (111), 48.3° (211), and 56.1° (013) are attributed to FeP with a orthorhombic structure (JCPDS 65-2595). The XRD pattern of FeP and MoS$_2$—NS are presented in the same figure The elemental composition of FeP/MoS$_2$—NS was investigated by XPS as shown in FIG. 1B. In the Fe 2p spectrum (FIG. 1C), the peaks centered at 711.6 and 724.8 eV account for $Fe^{3+}2p_{3/2}$ and $Fe^{3+}2p_{1/2}$ respectively, which agrees well with those peaks reported in the literature for Fe coordinated to P. See Suliman et al.; Gao et al.; and Zhou et al.

Figure 1D:
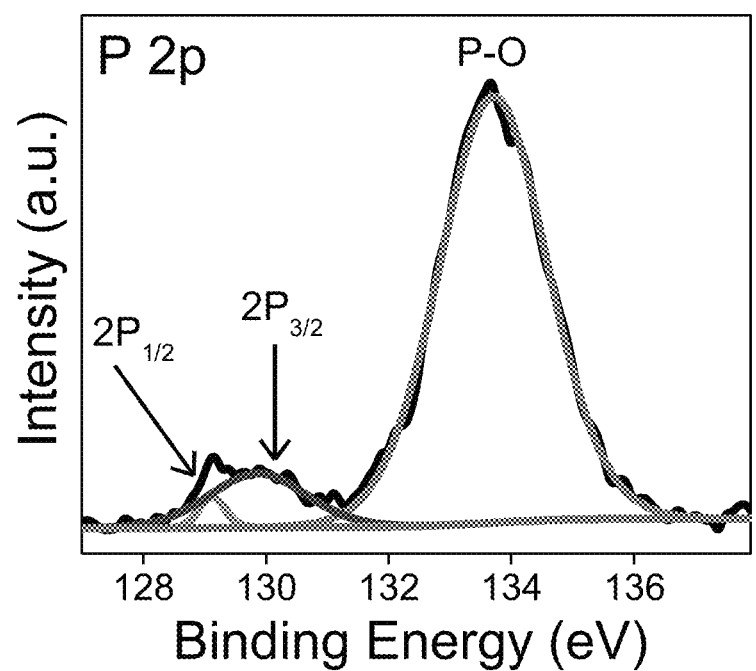
FIG. 1D shows the XPS of FeP/MoS$_2$ at the P 2p spectrum.
Figure 1E:
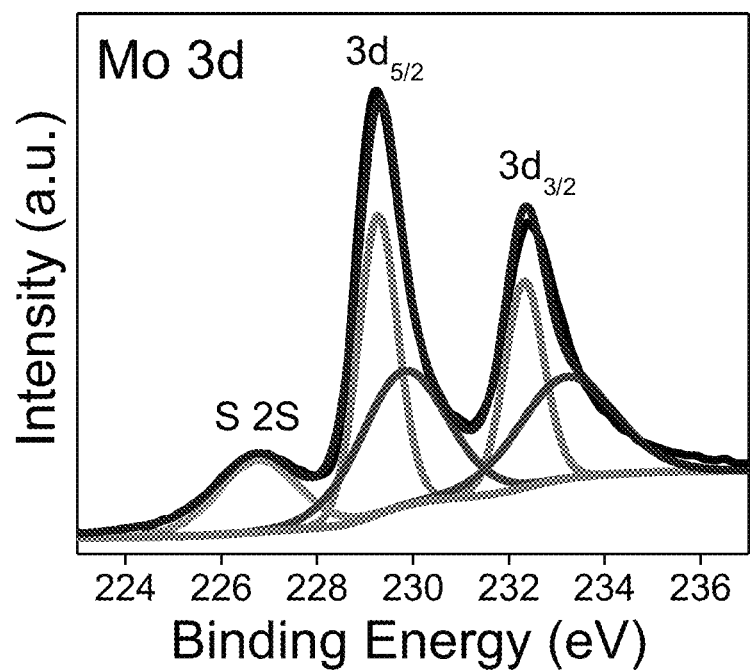
FIG. 1E shows the XPS of FeP/MoS$_2$ at the Mo 3d spectrum.
Figure 1F:
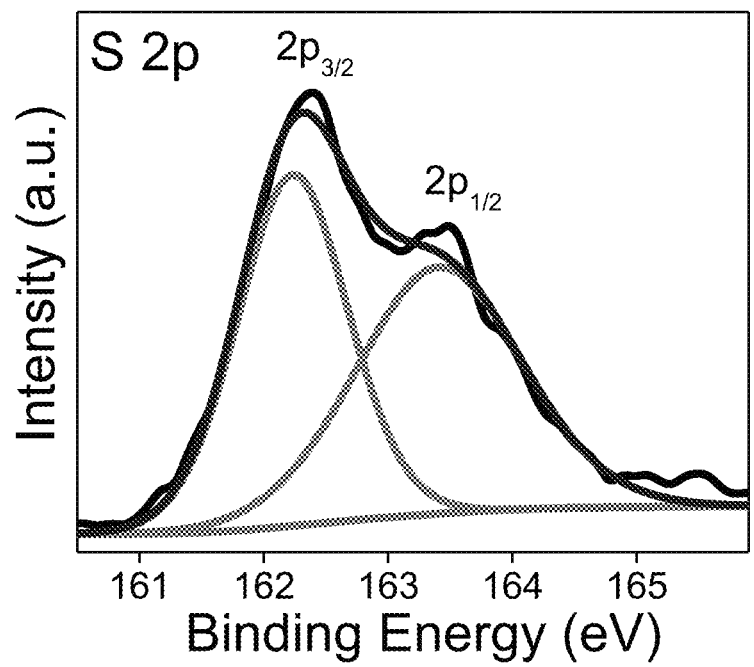
FIG. 1F shows the XPS of FeP/MoS$_2$ at the S 2p spectrum.

The peaks at 130.3 and 131.4 eV in the P 2p spectrum (FIG. 1D) are ascribed to $2_{P3/2}$ and $4_{1/2}$ of P bonded to Fe. See Karunadasa et al. In addition, the intense and broad peak observed at 134.4 eV is assigned to $PO_4^{-3}$. See Zhou et al. The Mo 3d spectrum (FIG. 1E) revealed four peaks at 226.1, 229.2, and 232.5 eV corresponding to S2S, Mo $3d_{5/2}$, and Mo $3d_{3/2}$ respectively; the peak at 236.4 eV corresponds to Mo (VI) due to the surface oxidation of the molybdenum. For the S 2p spectrum (FIG. 1F), two peaks were observed at 161.2 and 162.9 eV for S $2p_{3/2}$S $2p_{1/2}$ respectively.

Figure 2A:
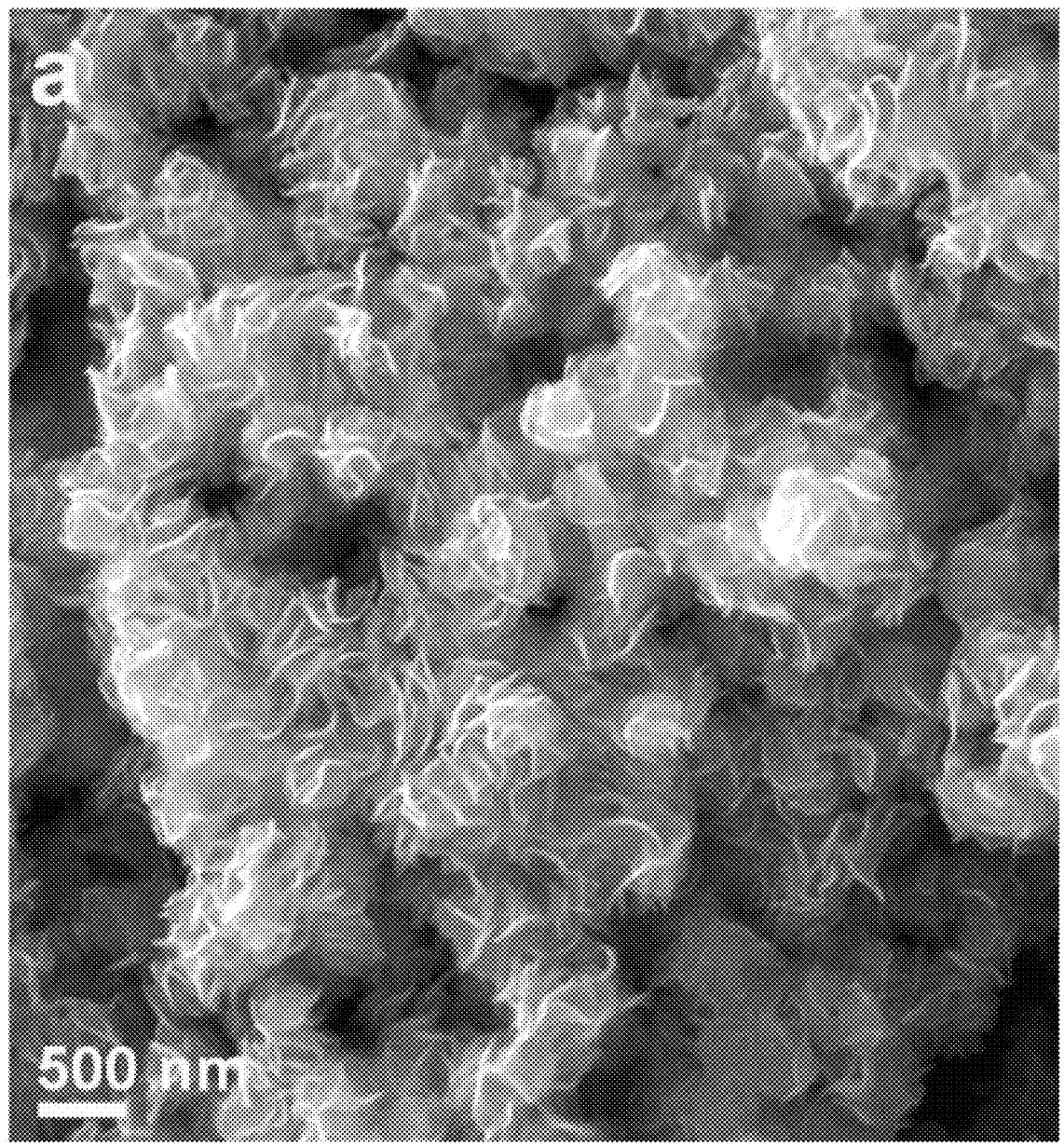
FIG. 2A is an FESEM of the MoS$_2$ nanosheets.
Figure 2B:
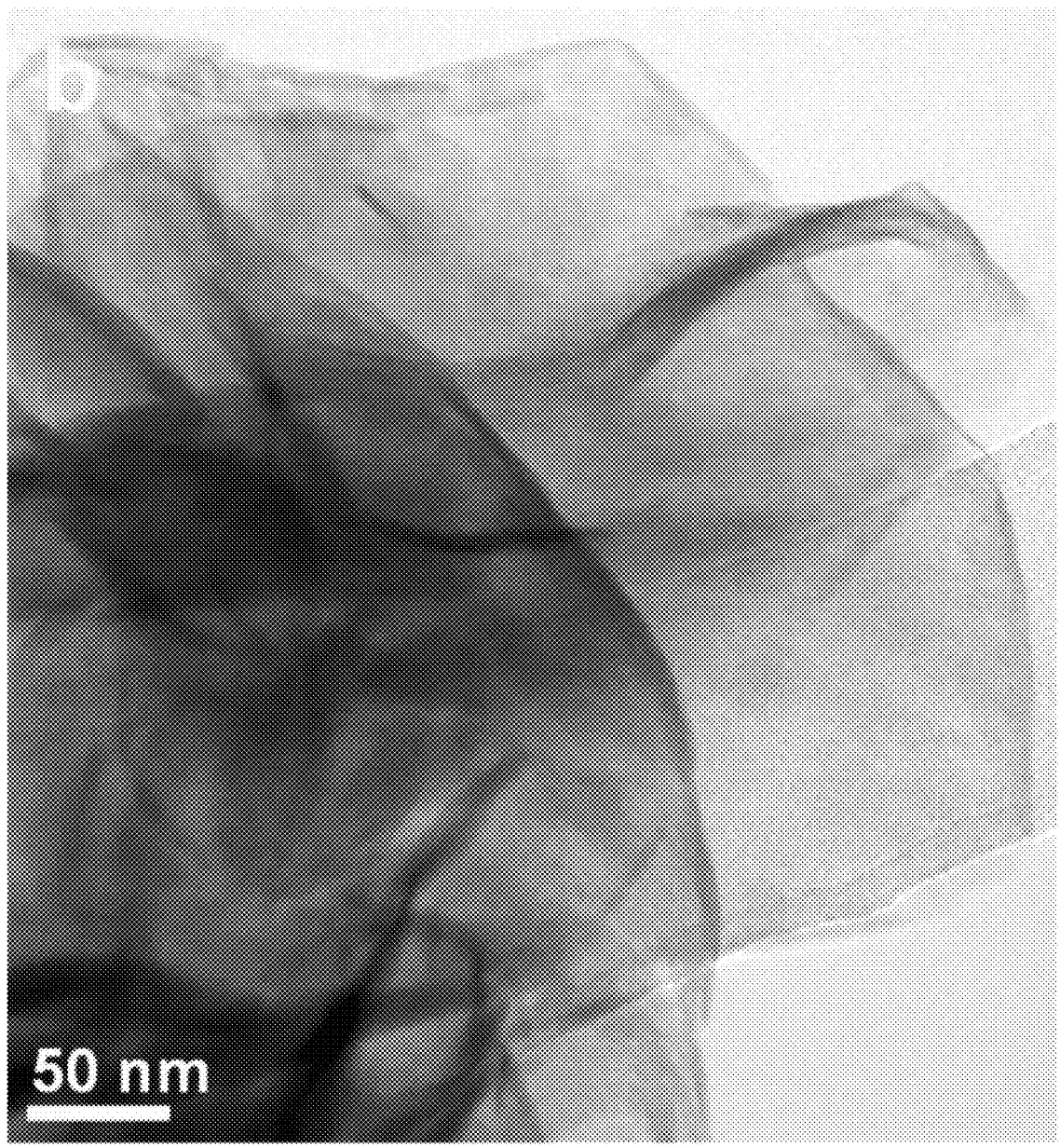
FIG. 2B is a TEM of the MoS$_2$ nanosheets.
Figure 2C:
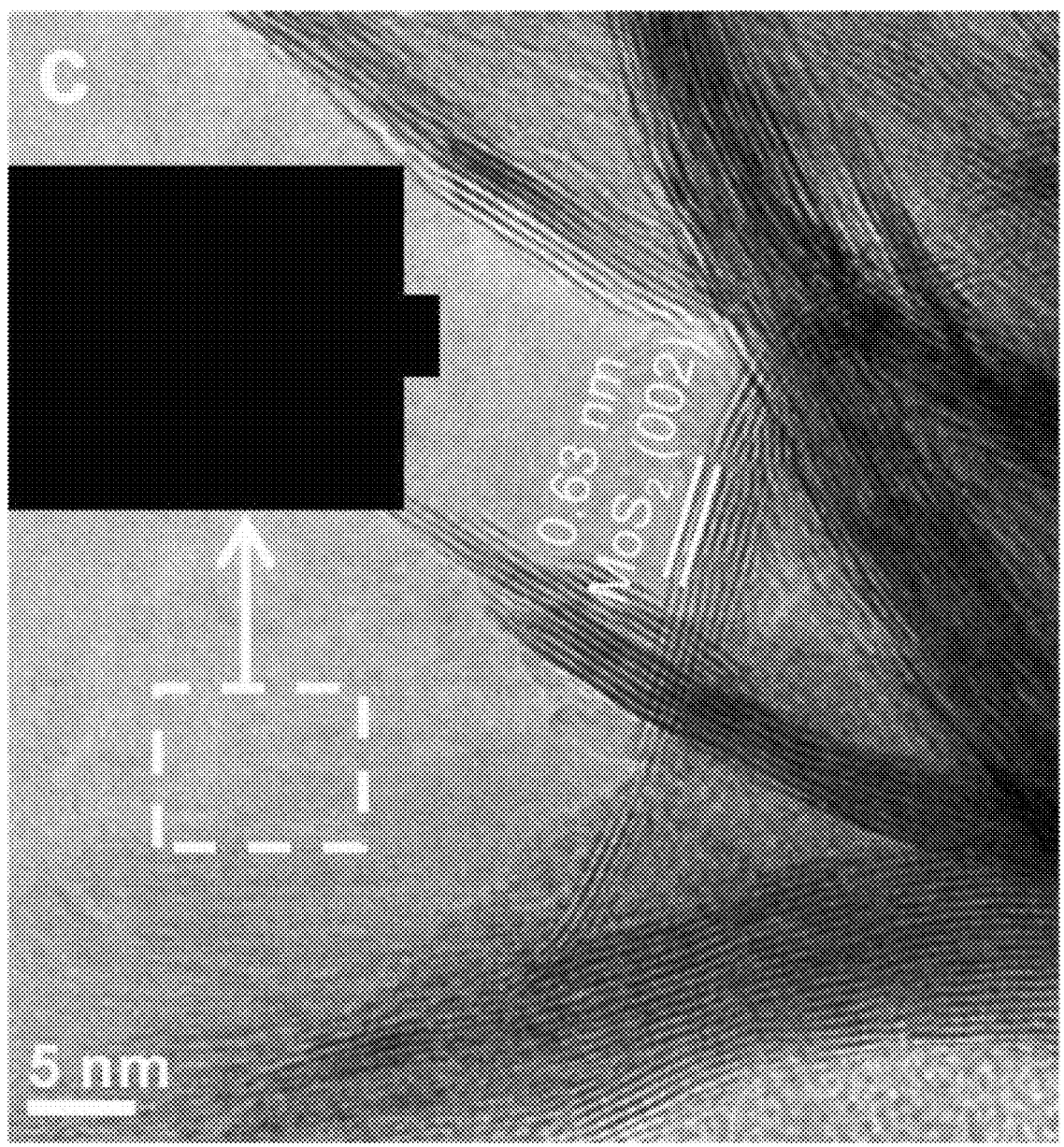
FIG. 2C is an HR-TEM of the MoS$_2$ nanosheets.
Figure 2D:
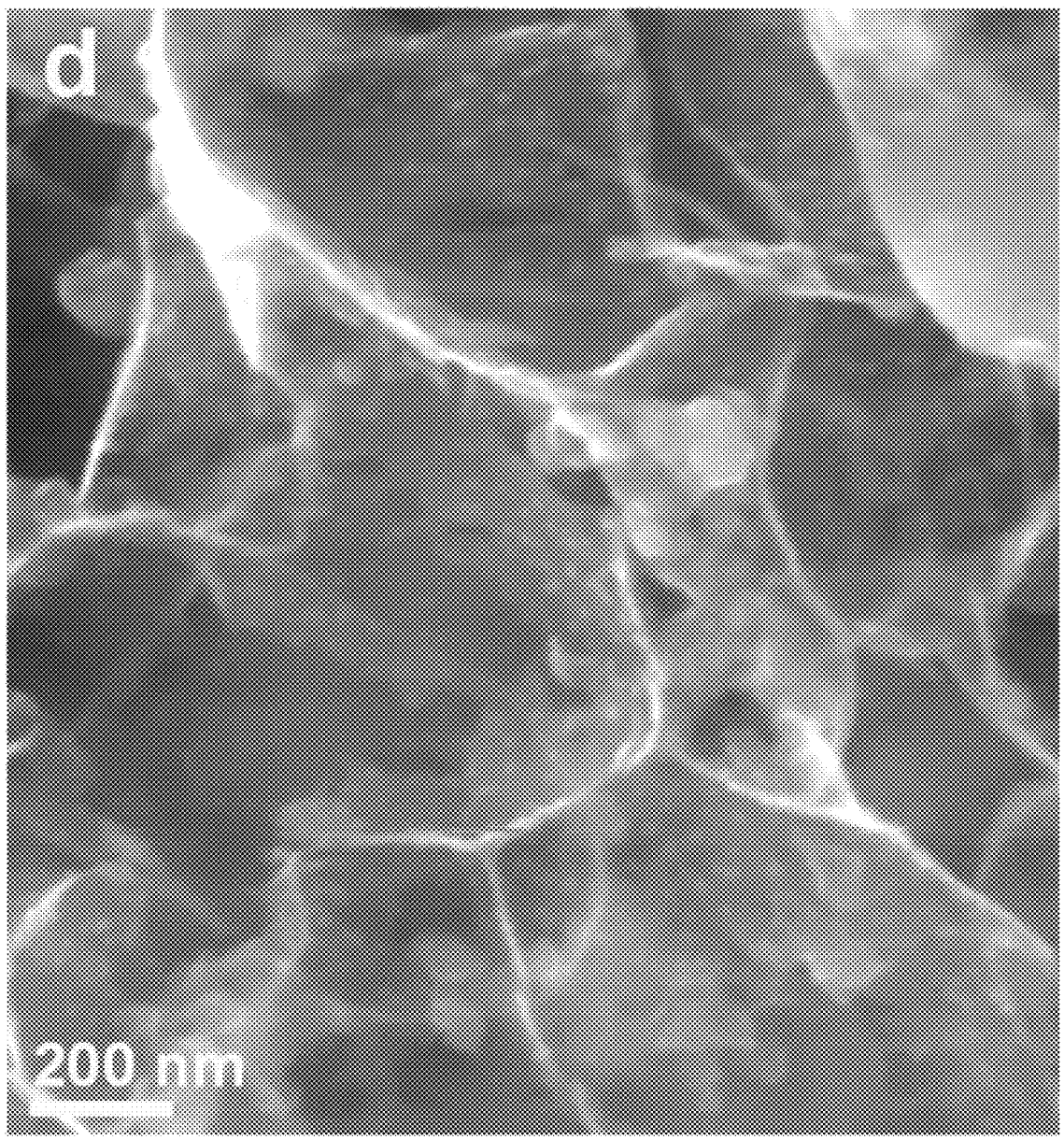
FIG. 2D is an FESEM of the FeP/MoS$_2$ nanosheets.
Figure 2E:
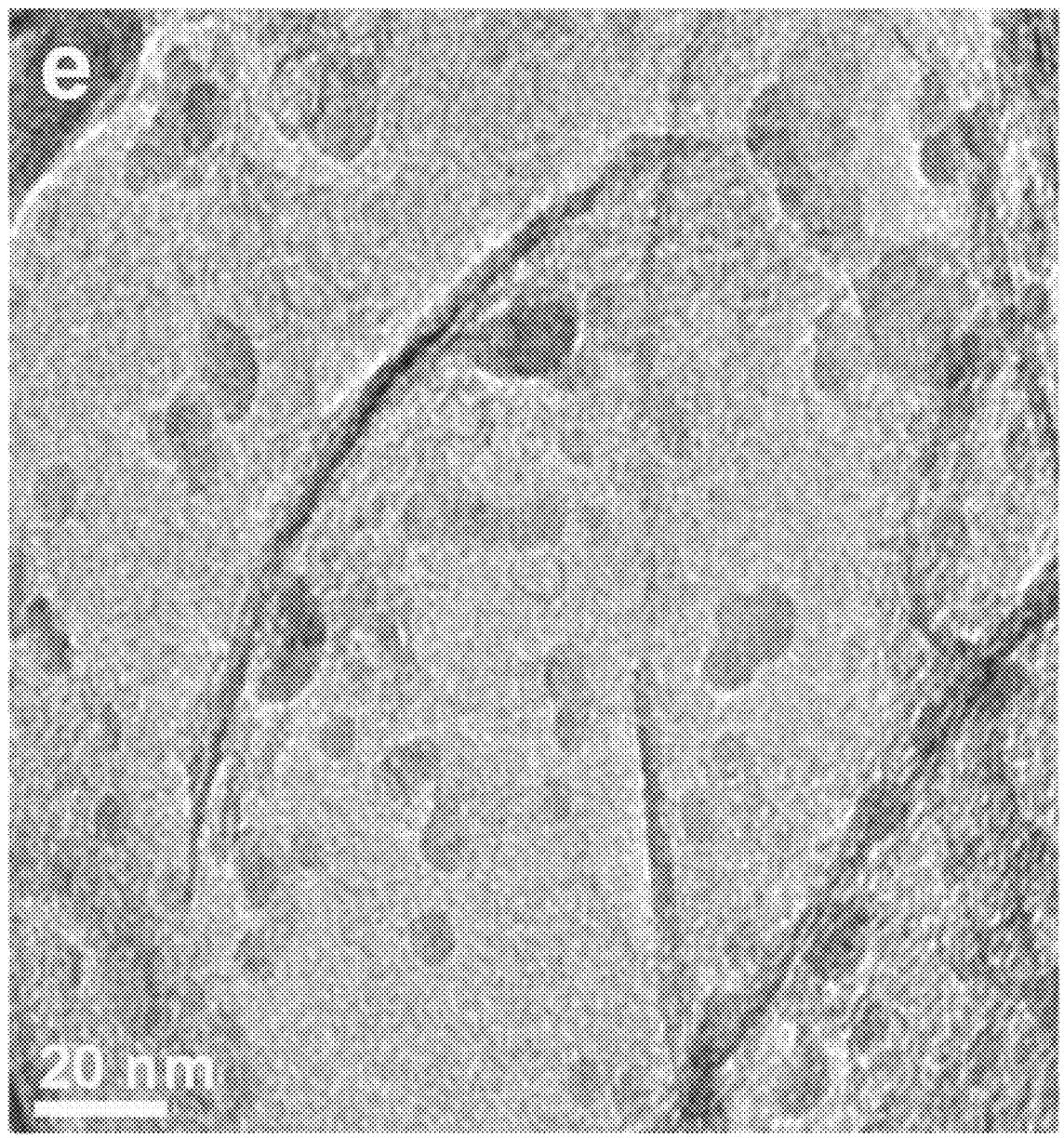
FIG. 2E is a TEM of the FeP/MoS$_2$ nanosheets.
Figure 2F:
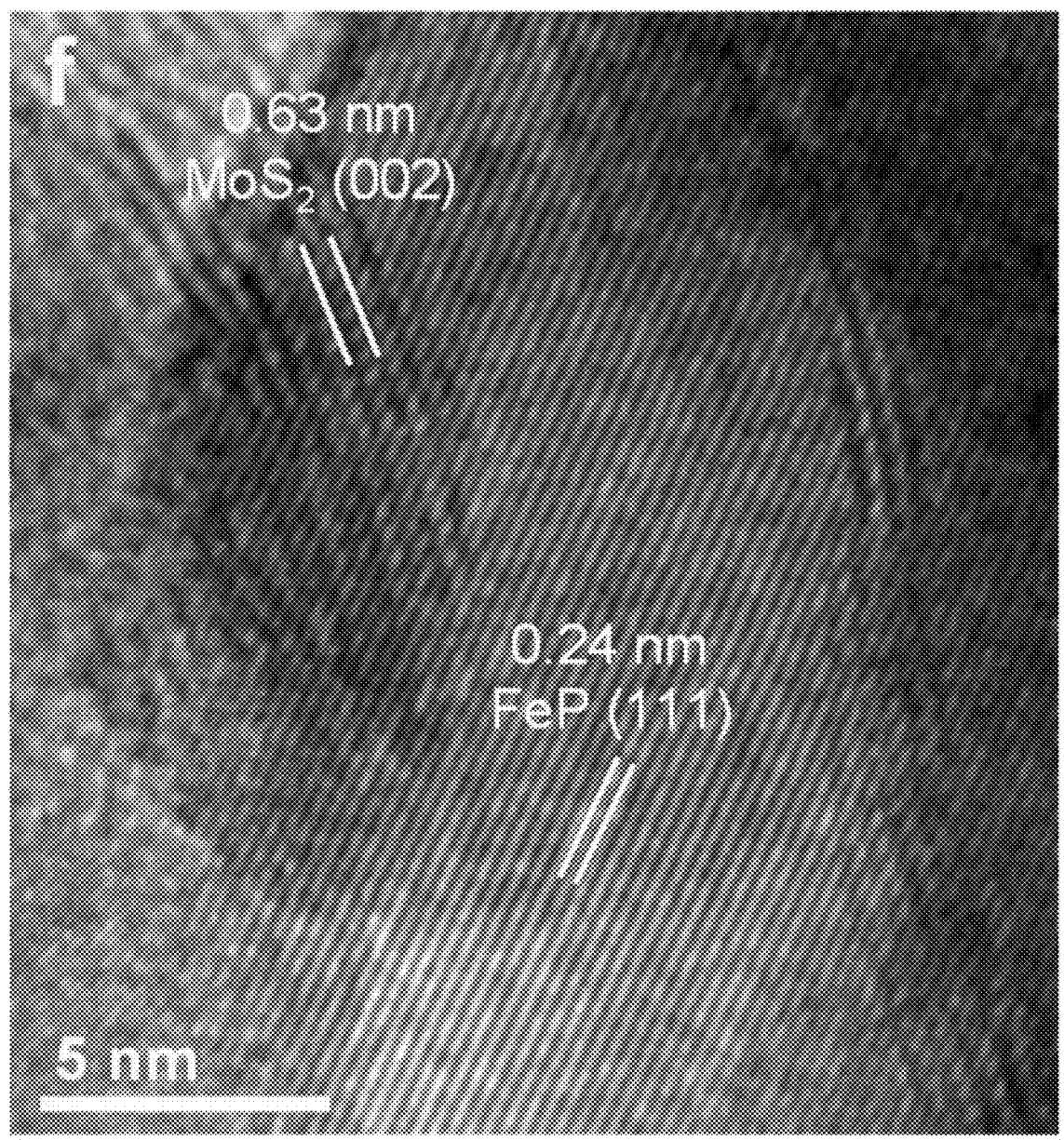
FIG. 2F is an HR-TEM of the FeP/MoS$_2$ nanosheets.
Figure 2G:
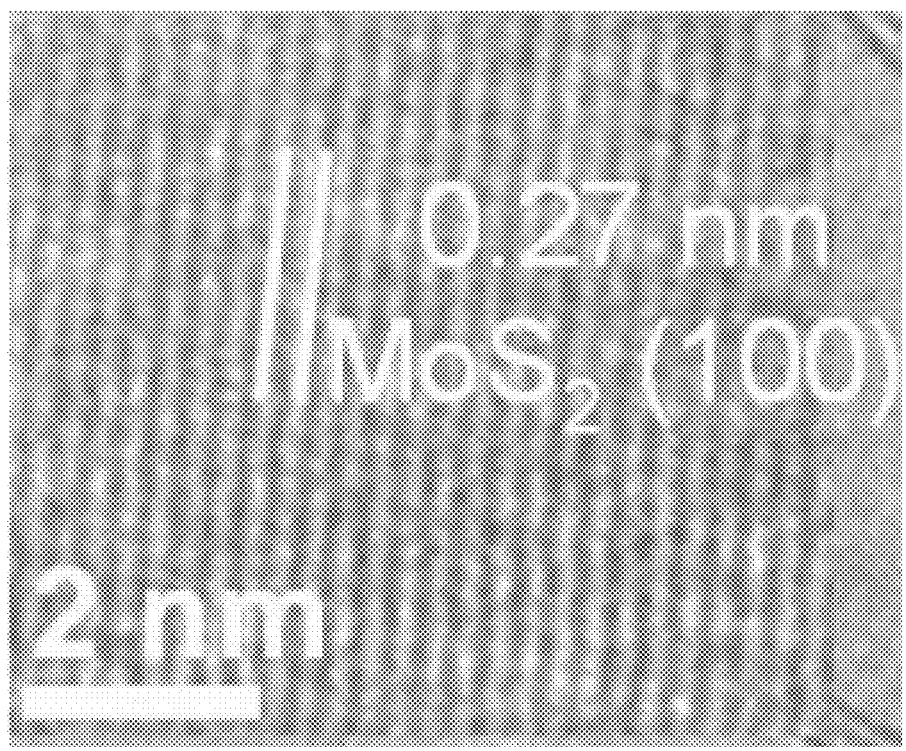
FIG. 2G is a zoomed-in view of the dashed line region in FIG. 2C.

The microstructural and morphological features of the as-prepared $MoS_2$—NS and FeP/$MoS_2$—NS were investigated using scanning and transmission electron microscopes. The FESEM of $MoS_2$—NS (FIG. 2A) confirmed the presence of nanosheets, while the ultrathin sheets were further confirmed by TEM (FIG. 2A) and HRTEM (FIG. 2B, with enlarged image of dashed line region shown in FIG. 2G). As shown in FIGS. 2C and 2G, the interplanar spacing was verified to be 0.27 nm and 0.63 nm, corresponding to $MoS_2$ nanosheets (100) and (002), respectively. The FESEM image of FeP/ $MoS_2$—NS indicates homogeneous dispersion of FeP nanoparticles on the nanosheets (FIG. 2D), which was confirmed by TEM (FIG. 2E), and the interplanar distance for the particles is characteristic for FeP (0.24 nm for (111)), as shown in FIG. 2E.

FeP/$MoS_2$—NS activity was evaluated by investigating the performance towards hydrogen evolution reaction (HER) in acidic medium (0.5M $H_2SO_4$). Linear sweep voltammetry (LSV) was recorded in the range between +0.1 and $-0.3$ $V_{RHE}$, with the current normalized to the geometric surface area of the working electrode (glassy carbon electrode (GSE)). Before obtaining the LSV, the GSE surface was activated by performing cycling voltammetry (CV) 5 times. For comparison this experiment was repeated under identical conditions to with pure FeP, $MoS_2$—NS, and commercial Pt/C.

Figure 3A:
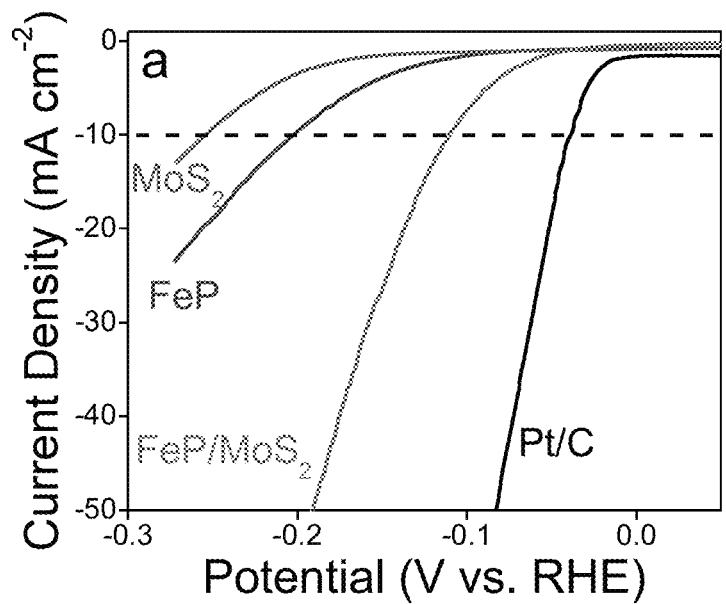
FIG. 3A shows polarization curves of MoS$_2$, FeP, FeP/MoS$_2$, and Pt/C.
Figure 3B:
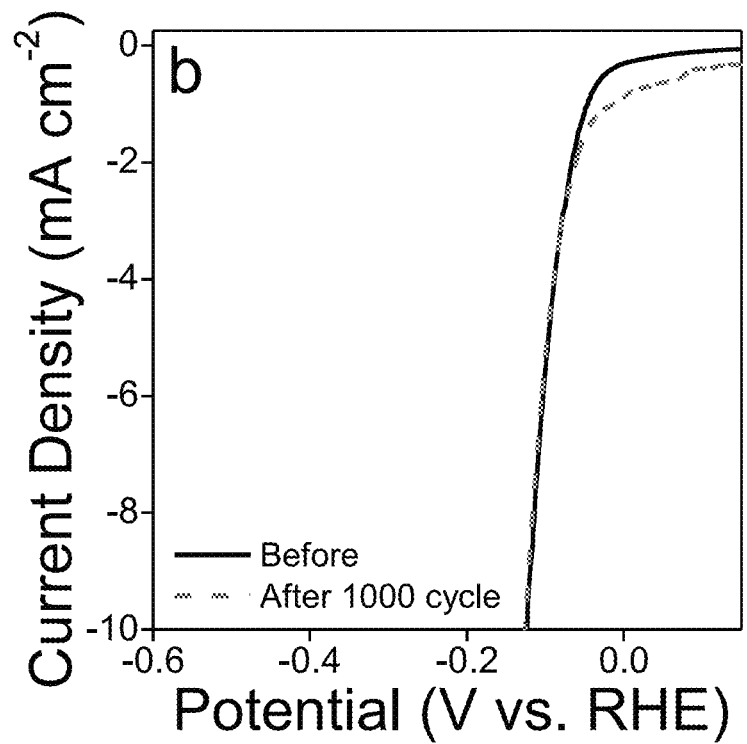
FIG. 3B shows linear sweep voltammetry curves of FeP/MoS$_2$ before and after 1,000 potentiodynamic measurements.
Figure 3C:
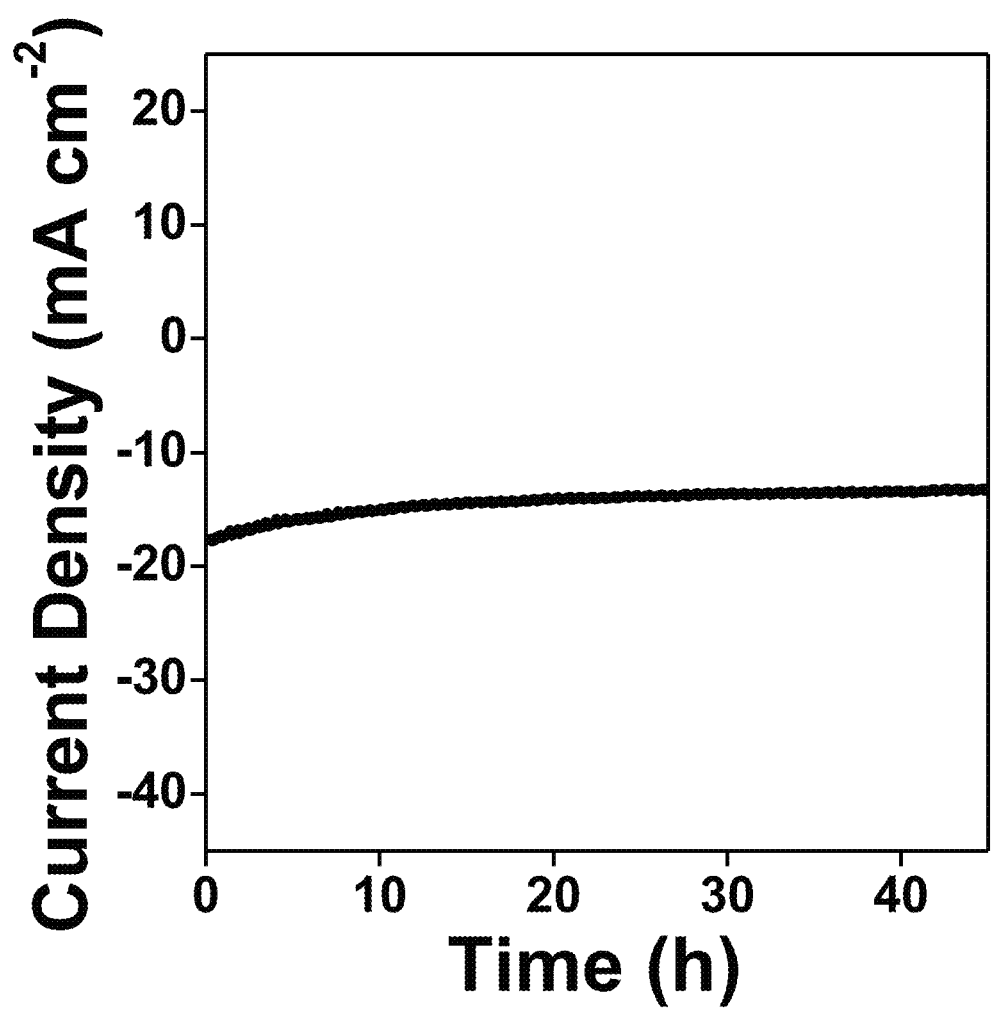
FIG. 3C is a current-time profile of FeP/MoS$_2$ over 45 h.

As shown in FIG. 3A, the commercial Pt/C (20%) showed the highest HER activity with the $MoS_2$—NS having the lowest activity. FeP particles showed a higher HER activity than the $MoS_2$—NS. A significant improvement in the HER activity can be observed when the FeP particles were dispersed in the nanosheets to form FeP/$MoS_2$—NS with an onset of only 50 and an overpotential 120 mV·cm$^{-2}$ in order to generate 10 mA·cm$^{-2}$. Moreover, the durability of the electrode was tested at scan rate of 50 mVs$^{-1}$ for 1,000 cycles in 0.5 M $H_2SO_4$. The LSV was measured before and after the 1,000 cycles and is shown in FIG. 3B. Here, the LSV shows no significant difference before and after the 1,000 cycles, which reflects an excellent stability for the electrocatalyst. A potentiostatic measurement was performed at a constant potential of 160 mV for 24 h, and the resulting time-dependent current density curve is shown in FIG. 3C.

EXAMPLE 3

Specific and Electrochemical Active Surface Area (ECASA)

Figure 4A:
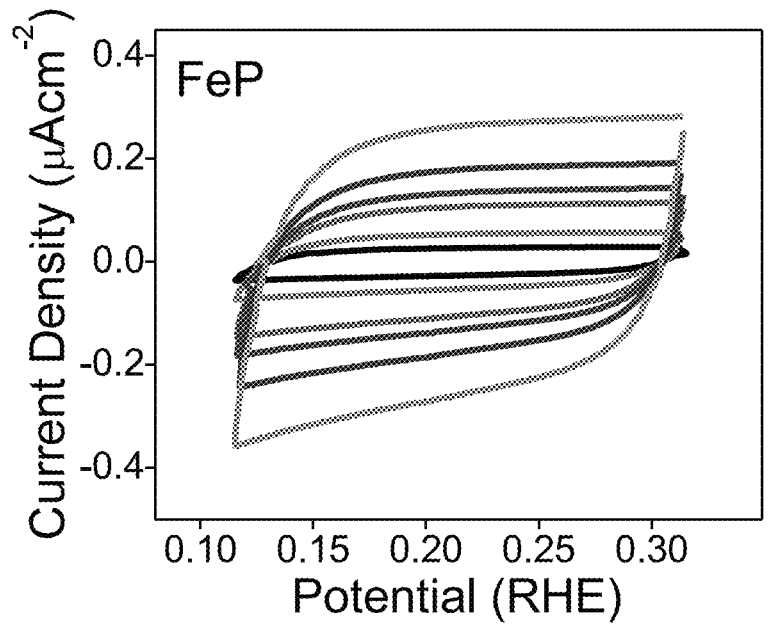
FIG. 4A shows cyclic voltammograms of FeP at different scan rates between 5 and 100 mVs$^{-1}$.
Figure 4B:
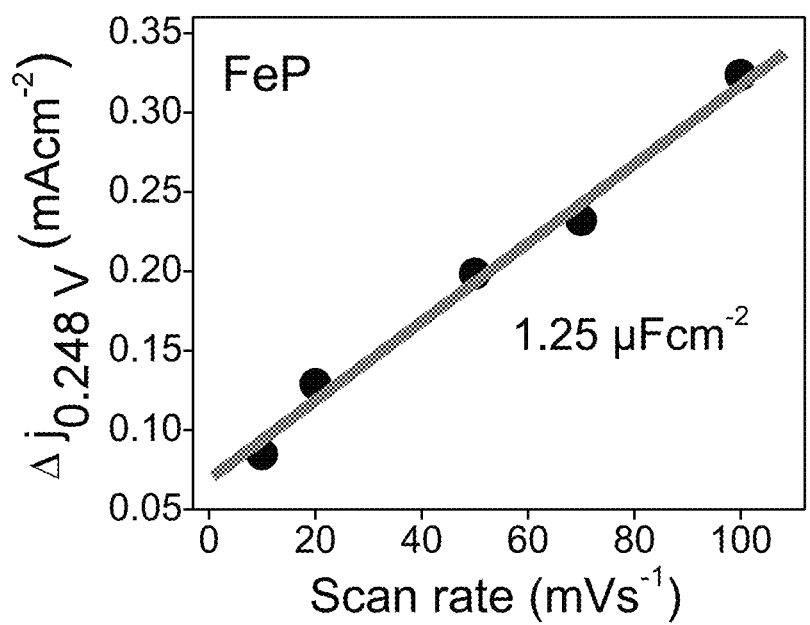
FIG. 4B shows the corresponding plots from FIG. 4A of the current density at 0.248 V$_{RHE}$ vs. scan rate.
Figure 4C:
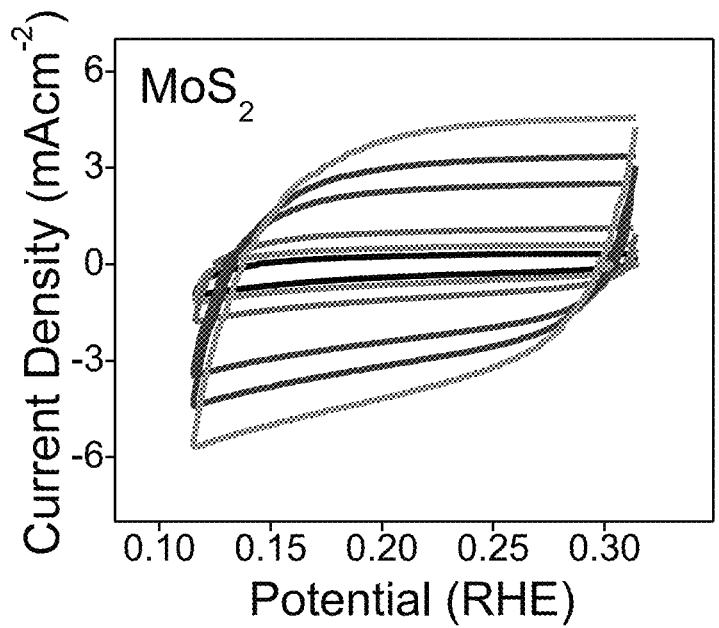
FIG. 4C shows cyclic voltammograms of MoS$_2$ at different scan rates between 5 and 100 mVs$^{-1}$.
Figure 4D:
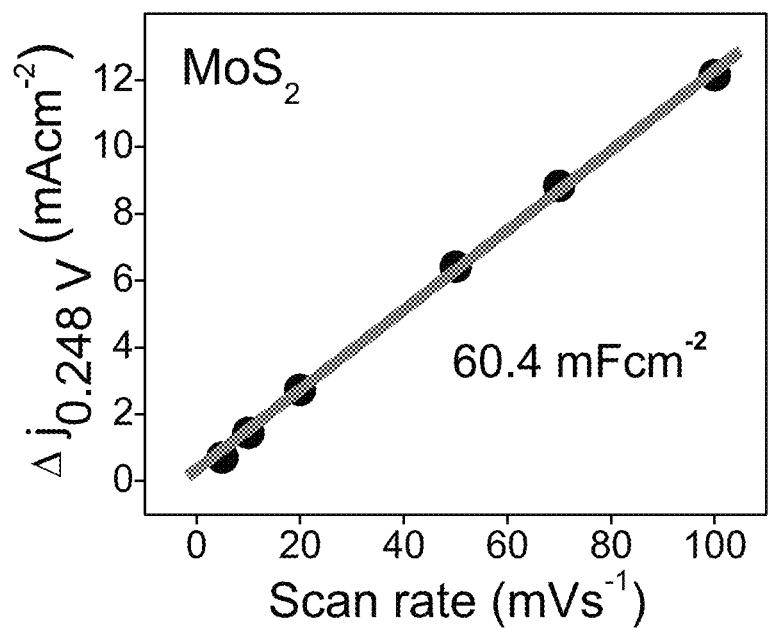
FIG. 4D shows the corresponding plots from FIG. 4C of the current density at 0.248 V$_{RHE}$ vs. scan rate.
Figure 4E:
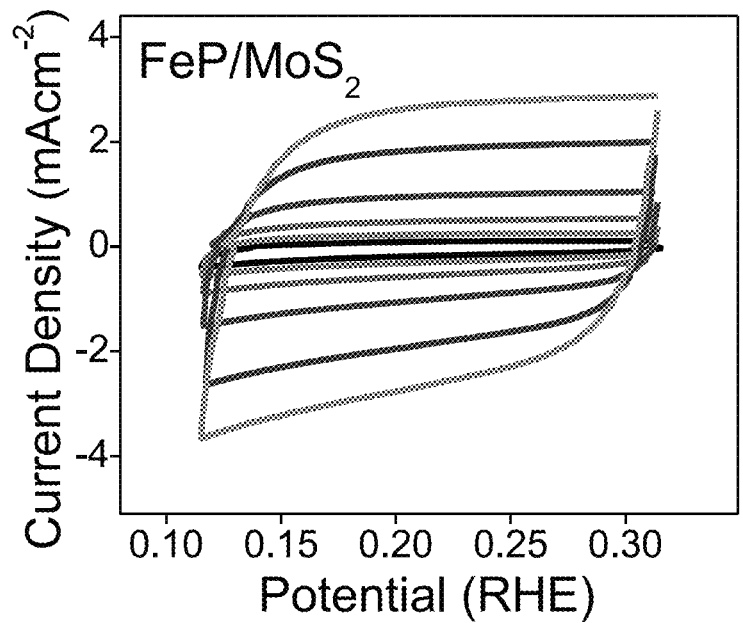
FIG. 4E shows cyclic voltammograms of MoS$_2$/FeP at different scan rates between 5 and 100 mVs$^{-1}$.
Figure 4F:
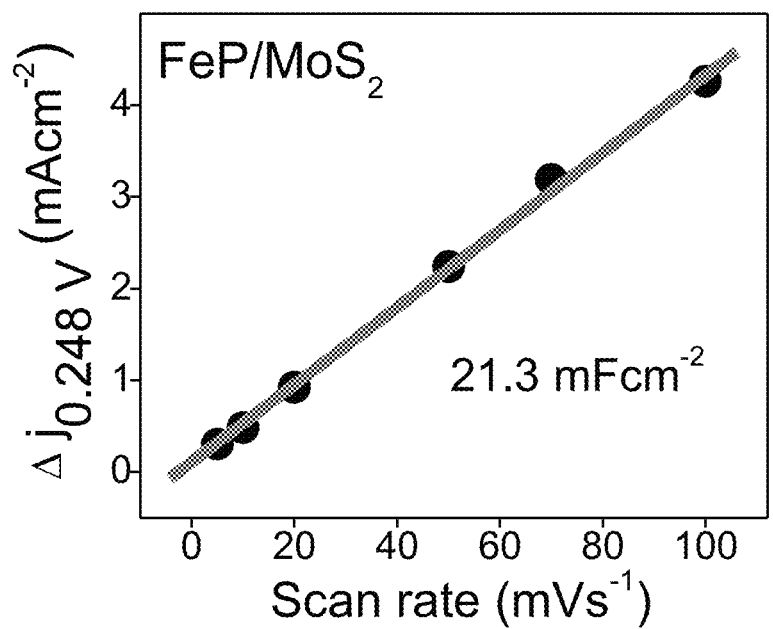
FIG. 4F shows the corresponding plots from FIG. 4E of the current density at 0.248 V$_{RHE}$ vs. scan rate.

The specific surface area of the prepared materials was calculated using a BET surface analyzer. The resulting surface areas obtained for FeP, $MoS_2$—NS, and FeP/$MoS_2$—NS were 46.9, 29.6, and 15 m$^2$g$^{-1}$, respectively. The ECASA was estimated for each sample by double layer capacitance ($C_{dl}$) obtained by recording cyclic voltammograms (CVs) at different scan rates (FIGS. 4A, 4C, 4E). FIGS. 4B, 4D, and 4F show the In case of $MoS_2$—NS and FeP/$MoS_2$—NS, the value of specific surface area is consistent with ECASA values, which were estimated to be 60.4 and 21.3 mF·cm$^{-2}$, respectively. However, FeP showed a very low $C_{dl}$ value equal to 1.25 μF·cm$^{-2}$, which could be attributed to the agglomeration of unsupported nanoparticles. Thus, the dispersion of the FeP onto $MoS_2$—NS increases the ECASA of the FeP particles and increases the HER activity.

EXAMPLE 4

Estimation of Electrochemical Impedance (EIS)

Figure 5A:
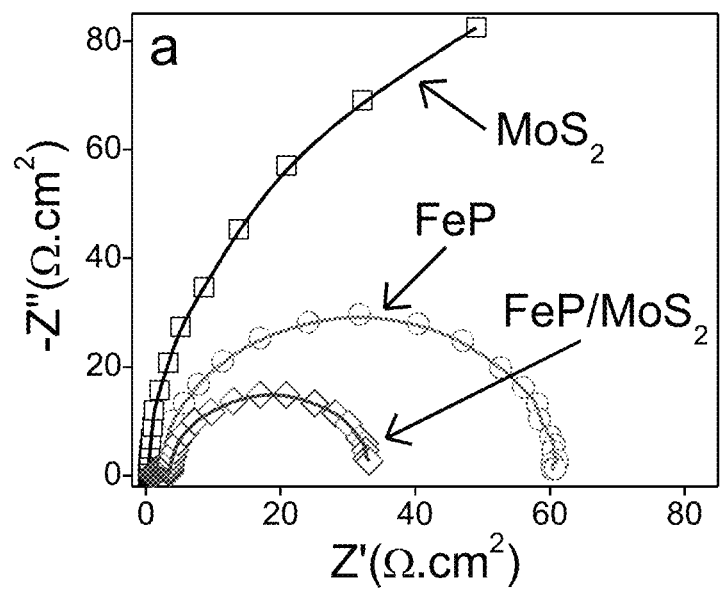
FIG. 5A is a comparative of Nyquist plots recorded at 90 mV.

Further information about the process kinetics and conductivity for the prepared electrocatalysts was investigated through electrochemical impedance spectroscopy (EIS) to calculate charge transfer resistance ($R_{ct}$) from the semicircle in the Nyquist plot. All the measurements are performed from 10$^5$ Hz to 0.01 Hz with an AC amplitude of 10 mV at different cathodic or negative overpotentials (η=0 to 150 mV vs. RHE) in acidic medium. From FIG. 5A, it can be seen that the FeP/$MoS_2$—NS showed the lowest $R_{ct}$, followed by FeP and $MoS_2$—NS, which can explain why the FeP/$MoS_2$—NS possesses the highest HER activity due to the lower resistivity of electron transfer. Likewise, this also illustrates that while the $MoS_2$—NS has the highest $C_{dl}$, it showed the lowest HER activity because of the poor electrical conductivity (high $R_{ct}$). FIG. 5C shows a Bode plot of FeP/$MoS_2$ at 150 mV.

In view of this, the dispersion of FeP onto the $MoS_2$—NS enhances the charge transfer, which leads to better HER activity.

HER proceeds following two different mechanisms, which includes three probable reactions—(1) Volmer reaction (adsorption), (2) Tafel reaction (chemical desorption) and (3) Heyrovsky reaction (electrochemical desorption), as shown below. See Voiry et al.

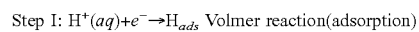
Step I: $H^+(aq)+e^- \rightarrow H_{ads}$ Volmer reaction(adsorption)

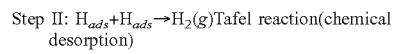
Step II: $H_{ads}+H_{ads} \rightarrow H_2(g)$ Tafel reaction(chemical desorption)

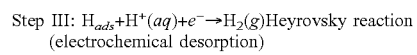
Step III: $H_{ads}+H^+(aq)+e^- \rightarrow H_2(g)$ Heyrovsky reaction (electrochemical desorption)

Figure 5B:
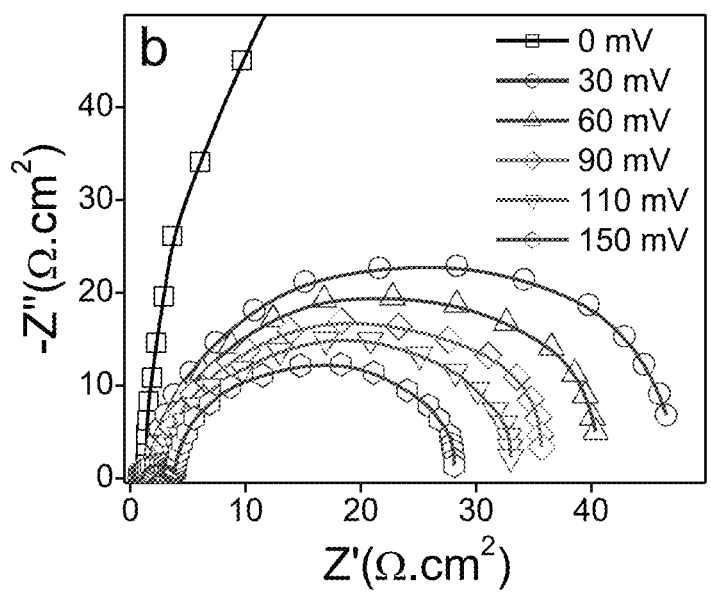
FIG. 5B is a potential-dependent evolution of Nyquist plots of FeP/MoS$_2$.
Figure 5C:
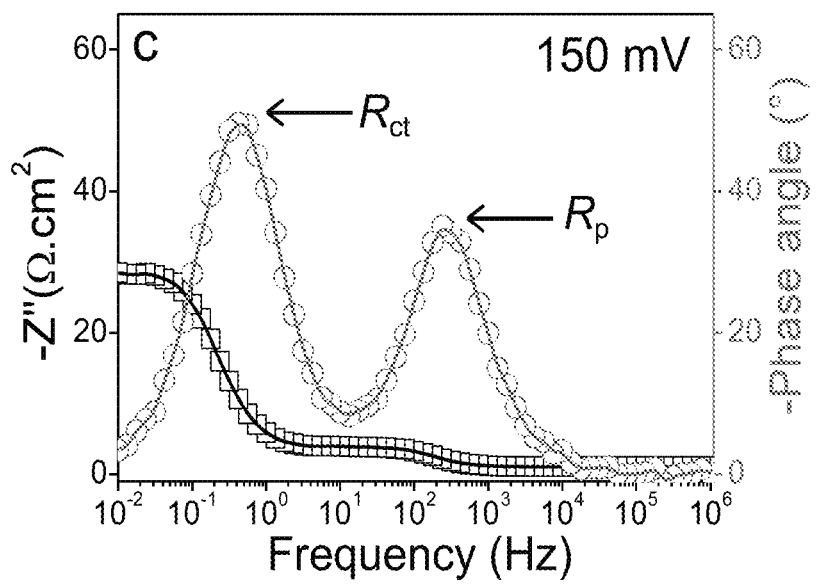
FIG. 5C is a Bode plot of FeP/MoS$_2$ at 150 mV.

Tafel slopes can be estimated from EIS using the potential-dependent Nyquist plot in acidic medium, as shown in FIG. 5B. The $R_{ct}$ decreased with increasing the potential.

Figure 5D:
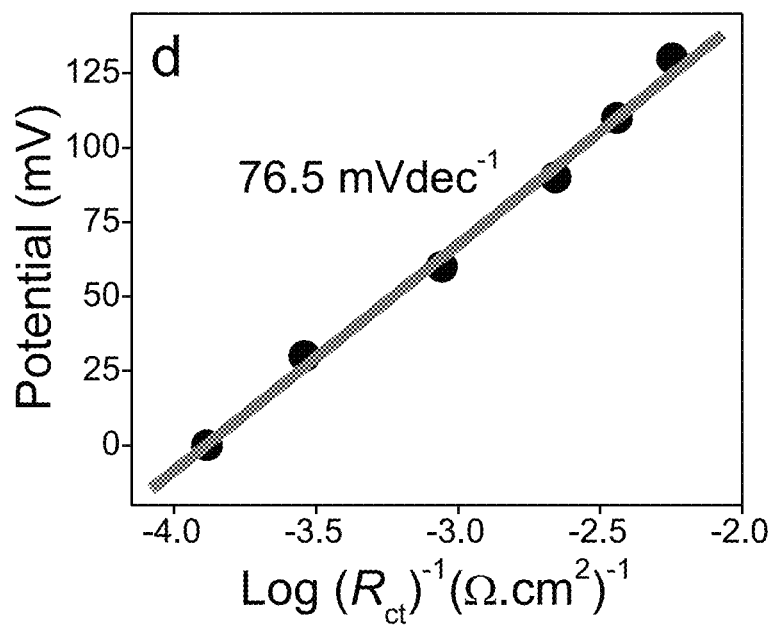
FIG. 5D is a Tafel slope of FeP.
Figure 5E:
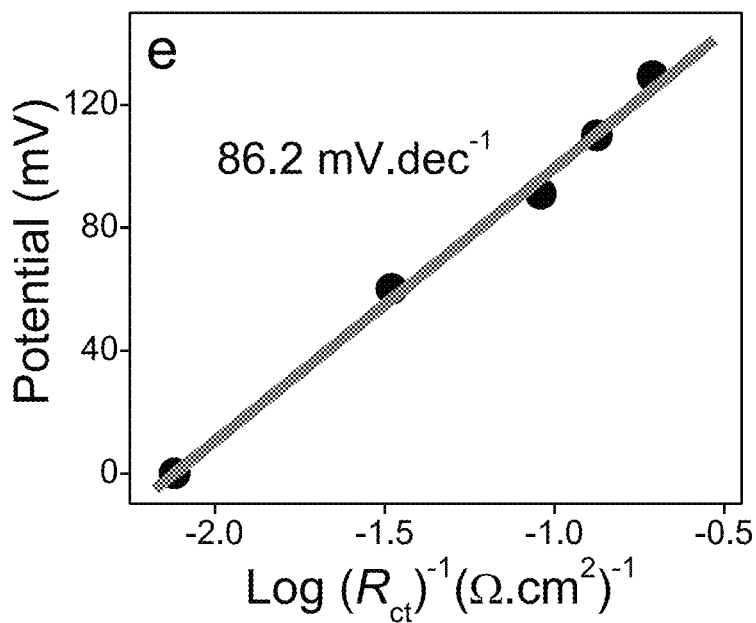
FIG. 5E is a Tafel slope of MoS$_2$.
Figure 5F:
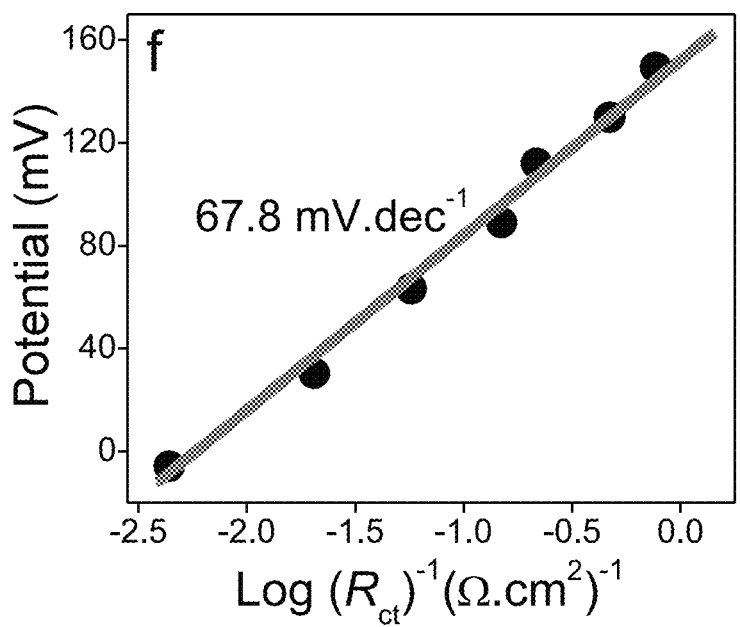
FIG. 5F is a Tafel slope of FeP/MoS$_2$.

FIGS. 5D-5F show Tafel slopes of the electrodes determined from EIS. Tafel slopes estimated from EIS results represent entirely charge transport kinetics. Respective slopes of FeP, $MoS_2$—NS, and FeP/$MoS_2$—NS electrodes are shown in FIGS. 5D, 5E, and 5F. The Tafel values are calculated to be 76.5, 86.2, and 67.8 mVdec$^{-1}$ for FeP, $MoS_2$—NS, and FeP/$MoS_2$—NS, respectively, and from these values the as synthesized electrocatalysts follow a Volmer-Heyrovsky mechanism.

EXAMPLE 5

Estimation of Turnover Frequency (TOF)

The efficiency of catalytic process can be evaluated through turnover frequency (TOF). The catalytic performance of the as prepared electrocatalysts ($MoS_2$—NS, FeP, and FeP/$MoS_2$—NS) was compared using TOF, which is the number of reactant species that are reacted per active site per unit of time. The TOF values are directly proportional to the catalytic activity.

Figure 6A:
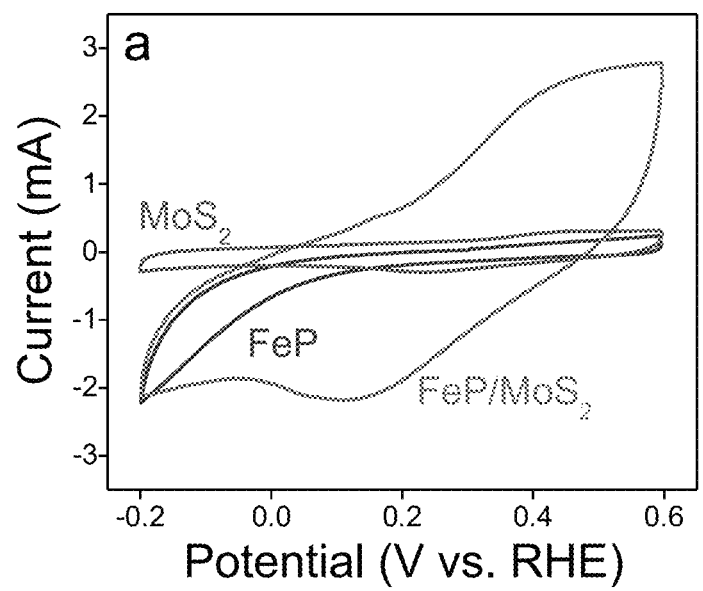
FIG. 6A shows cyclic voltammograms of FeP, MoS$_2$, and FeP/MoS$_2$ recorded between −0.2 and 0.6 V$_{RHE}$.
Figure 6B:
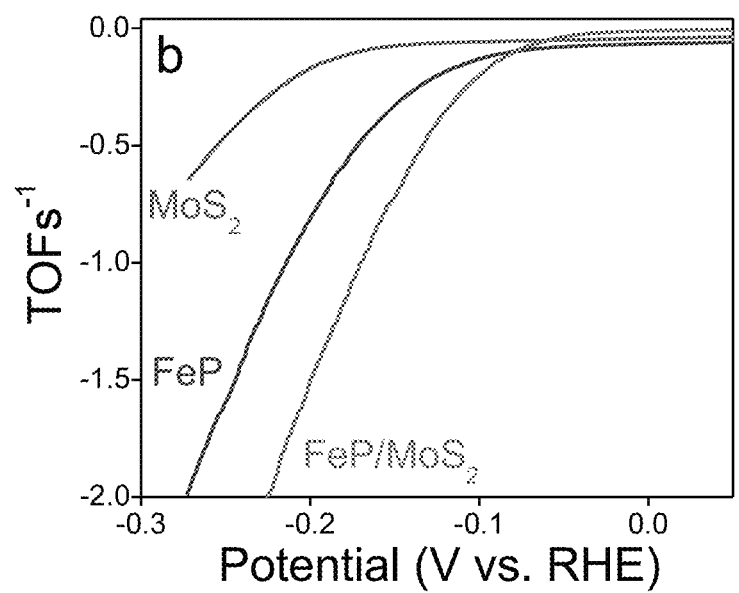
FIG. 6B shows the turn over frequency (TOF) of FeP, MoS$_2$, and FeP/MoS$_2$ vs. overpotential.

As it is clear in FIG. 6A, the number of active sites was determined to be 7.30×10$^{-9}$ mol, 0.62×10$^{-8}$ mol, and 1.83×10$^{-8}$ mol for $MoS_2$—NS, FeP, and FeP/ $MoS_2$—NS, respectively, using a scan rate of 20 mV·s$^{-1}$. The number of active sites was used to calculate TOF according to Eq. 1, and the values were −0.060, −0.16, and −0.20 s$^{-1}$ for MoS$_2$—NS, FeP, and FeP/MoS$_2$—NS, respectively, as shown in FIG. 6B. See Suliman et al., Carbon 144, 764-71 (2019), incorporated herein by reference in its entirety.

$$TOF = JA/2FN \tag{1}$$

This data shows that the higher HER activity of FeP/MoS$_2$—NS may be due to the availably of more active sites for the H$^+$ to produce H$_2$.

The FeP/MoS$_2$—NS obtained by the method described above shows higher HER activity, ECSA, EIS, TOF, than FeP or MoS$_2$ alone, and also shows a unique morphology. The MoS$_2$ nanosheets facilitated the robust and uniform dispersion of FeP nanoparticles, which is observed to significantly enhance the electrocatalytic performance.

The invention claimed is:

1. An electrocatalyst, comprising:
molybdenum disulfide nanosheets having an average length in a range of 300 nm 1 µm, and
iron phosphide nanoparticles having an average diameter in a range of 5-20 nm,
wherein the iron phosphide nanoparticles are distributed on the molybdenum disulfide nanosheets with an average nearest neighbor distance of the nanoparticles between 12-20 nm.

2. The electrocatalyst of claim 1, wherein the electrocatalyst consists essentially of Mo, S, Fe, and P.

3. The electrocatalyst of claim 1, wherein the molybdenum disulfide nanosheets are crystalline with interplanar spacing in a range of 0.26-0.28 nm or 0.62-0.64 nm.

4. The electrocatalyst of claim 1, wherein the molybdenum disulfide nanosheets have XRD peaks at 2(θ) Bragg angles of 33.2±1° and 59.1±1°.

5. The electrocatalyst of claim 1, wherein the iron phosphide nanoparticles are crystalline with interplanar spacing in a range of 0.23-0.25 nm.

6. The electrocatalyst of claim 1, wherein the iron phosphide nanoparticles have XRD peaks at 2(θ) Bragg angles of 37.2±1°, 48.3±1°, and 56.1±1°.

7. The electrocatalyst of claim 1, which has an electroactive surface area in a range of 10-50 mF·cm$^{-2}$.

8. The electrocatalyst of claim 1, wherein the iron phosphide nanoparticles have a Fe to P molar ratio in a range of 0.75-1.25.

9. The electrocatalyst of claim 8, wherein the iron phosphide nanoparticles consist essentially of FeP.

10. The electrocatalyst of claim 1, wherein a mass ratio of the iron phosphide nanoparticles to the molybdenum disulfide nanosheets is in a range of 0.60-0.95.

11. An electrocatalyst, comprising:
molybdenum disulfide nanosheets having an average length in a range of 300 nm-1 µm, and
iron phosphide nanoparticles having an average diameter in a range of 5-20 nm, and
wherein the molybdenum disulfide nanosheets have an average thickness of less than 5 nm.

12. An electrocatalyst, comprising:
molybdenum disulfide nanosheets having an average length in a range of 300 nm-1 µm, and
iron phosphide nanoparticles having an average diameter in a range of 5-20 nm, and
which has a BET surface area in a range of 10-20 m$^2$/g.

13. An electrochemical cell, comprising:
a working electrode comprising the electrocatalyst of claim 1,
a counter electrode, and
an electrolyte solution in contact with both electrodes, the electrolyte solution comprising water and an inorganic acid.

14. The electrochemical cell of claim 13, wherein the working electrode comprises the electrocatalyst deposited on glassy carbon, and
wherein the working electrode has an overpotential in a range of 100-140 mV/cm$^2$ at a current density of 10 mA/cm$^2$.

15. The electrochemical cell of claim 13, wherein the inorganic acid has a concentration in a range of 0.2-1.0 M.

16. A method for producing H$_2$ from an acidic electrolyte solution, the method comprising:
subjecting the electrodes of the electrochemical cell of claim 13 with a potential in a range of −1.0 to 1.0 V$_{RHE}$.

17. The method of claim 16, wherein the electrocatalyst has a turnover frequency in a range of 0.16-0.30 s$^{-1}$.

18. The method of claim 16, wherein the electrocatalyst has a number of active sites per electrocatalyst mass in a range of 1.4 ×10$^{-4}$ to 1.4 ×10$^{-3}$ mol/g.

19. The method of claim 16, further comprising separately collecting H$_2$-enriched gas and O$_2$-enriched gas.

* * * * *